(12) United States Patent
Bizer

(10) Patent No.: US 11,932,504 B2
(45) Date of Patent: *Mar. 19, 2024

(54) SYSTEMS FOR PROCESSING MATERIAL, TAPING STATIONS TO APPLY TAPE TO ONE OR MORE ROLLS OF MATERIAL, AND METHODS OF PROCESSING MATERIAL

(71) Applicant: Quad Plus LLC, New Lenox, IL (US)

(72) Inventor: Ilker Bizer, New Lenox, IL (US)

(73) Assignee: Quad Plus LLC, New Lenox, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,484

(22) Filed: Apr. 17, 2023

(65) Prior Publication Data

US 2023/0322515 A1  Oct. 12, 2023

Related U.S. Application Data

(63) Continuation of application No. 17/716,640, filed on Apr. 8, 2022, now Pat. No. 11,629,024.

(51) Int. Cl.
| | |
|---|---|
| *B65H 19/29* | (2006.01) |
| *B65H 16/04* | (2006.01) |
| *B65H 35/00* | (2006.01) |
| *B32B 38/00* | (2006.01) |

(52) U.S. Cl.
CPC ............ *B65H 19/29* (2013.01); *B65H 16/04* (2013.01); *B65H 35/0086* (2013.01); *B32B 38/0004* (2013.01); *B65H 2301/413526* (2013.01); *B65H 2301/414422* (2013.01); *B65H 2301/414433* (2013.01); *B65H 2301/414446* (2013.01); *B65H 2301/44324* (2013.01); *B65H 2301/51532* (2013.01); *B65H 2701/377* (2013.01); *Y10T 156/1374* (2015.01)

(58) Field of Classification Search
CPC .... B65H 19/29; B65H 16/04; B65H 35/0086; B65H 2301/413526; B65H 2301/414422; B65H 2301/414433; B65H 2301/414446; B65H 2301/44324; B65H 2301/51532; B65H 2701/377; B32B 38/0004; Y10T 156/1374

See application file for complete search history.

(56) References Cited

U.S. PATENT DOCUMENTS

| | | |
|---|---|---|
| 5,513,478 A | 5/1996 | Abt |
| 7,836,932 B2 | 11/2010 | Lucht |
| 8,215,086 B2 | 7/2012 | Maddaleni et al. |
| 11,629,024 B1 * | 4/2023 | Bizer ................. B65H 35/0086 156/523 |
| 2013/0032287 A1 | 2/2013 | Hagman et al. |
| 2016/0107859 A1 | 4/2016 | Lindberg et al. |

* cited by examiner

*Primary Examiner* — George R Koch
*Assistant Examiner* — Christopher C Caillouet
(74) *Attorney, Agent, or Firm* — Taft Stettinius & Hollister LLP

(57) ABSTRACT

Systems for processing material, taping stations to apply tape to one or more rolls of material, and methods of processing material are disclosed. A system for processing material includes a winding station and a taping station. The winding station includes a winder to wrap material around a mandrel to produce one or more rolls of material. The taping station is arranged downstream of the winding station to receive the one or more rolls of material therefrom and apply tape to the one or more rolls of material.

20 Claims, 13 Drawing Sheets

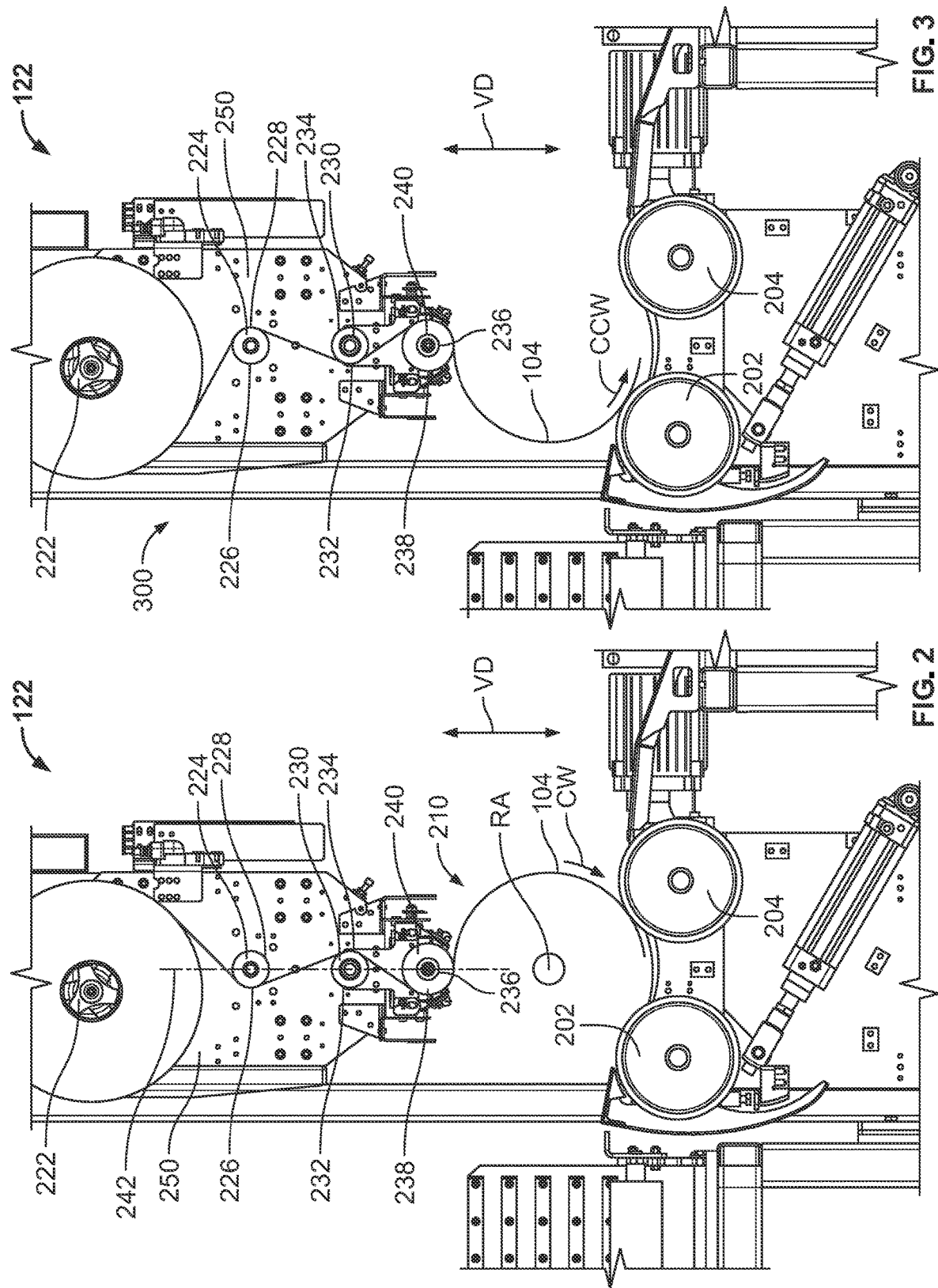

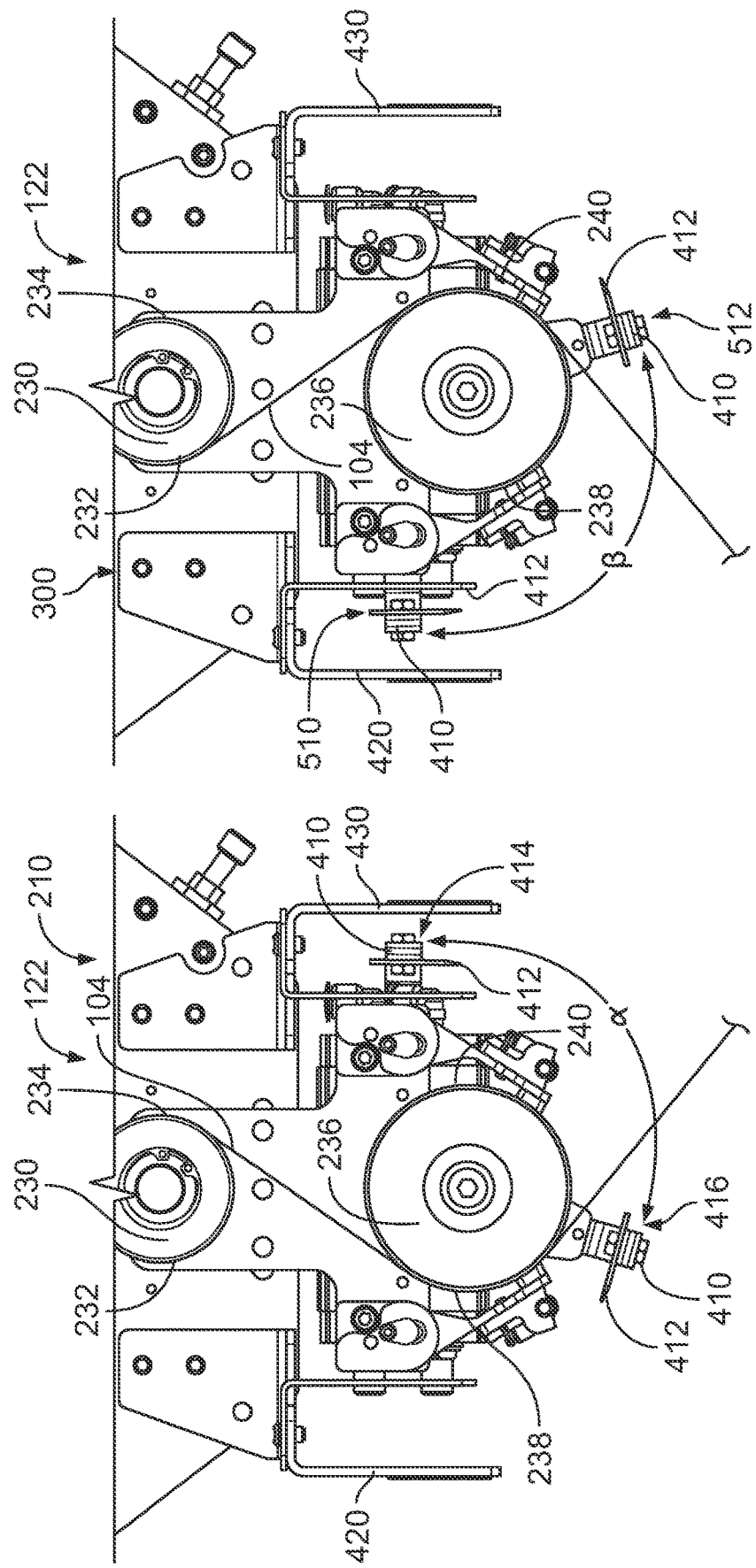

SYSTEMS FOR PROCESSING MATERIAL, TAPING STATIONS TO APPLY TAPE TO ONE OR MORE ROLLS OF MATERIAL, AND METHODS OF PROCESSING MATERIAL

CROSS-REFERENCE TO RELATED APPLICATION(S)

This application is a continuation of, and claims priority to, U.S. patent application Ser. No. 17/716,640, which was filed on Apr. 8, 2022, and which is incorporated by reference herein in its entirety.

TECHNICAL FIELD

The present disclosure generally relates to systems and methods for processing material, and, more particularly, to taping stations for taping rolls of material and methods of taping material using taping stations.

BACKGROUND

Current systems and methods for processing material suffer from a variety of drawbacks and limitations. In one example, current systems and methods for processing material may incorporate mechanisms for wrapping and/or winding material and for taping wrapped and/or wound material into a single device or unit, which may be associated with an undesired degree of complexity and cost, among other shortcomings. For those reasons, among others, there remains a need for further improvements in this technological field.

SUMMARY

The present disclosure may comprise one or more of the following features and combinations thereof.

According to one aspect of the present disclosure, a system for processing material may include a winding station and a taping station. The winding station may include a winder to wrap material around a mandrel to produce one or more rolls of material. The taping station may be arranged downstream of the winding station to receive the one or more rolls of material therefrom and apply tape to the one or more rolls of material. The taping station may include a plurality of tape head assemblies supported for translation relative to one another in a longitudinal direction. The plurality of tape head assemblies may be configured to apply tape to the one or more rolls of material at multiple locations along an axial length of each of the one or more rolls of material.

In some embodiments, the taping station may include a plurality of material support rollers to support the one or more rolls of material for rotation during a taping operation, each of the plurality of tape head assemblies may include a tape hub to support a roll of tape during the taping operation, and each of the plurality of tape head assemblies may include a plurality of guide rollers spaced from one another in a vertical direction to guide tape from the roll of tape supported on the tape hub circumferentially around the one or more rolls of material during the taping operation. The plurality of guide rollers may each have a first circumferential side and a second circumferential side arranged opposite the first circumferential side, the plurality of guide rollers may include a first guide roller, a second guide roller arranged beneath the first guide roller in the vertical direction relative to the one or more rolls of material supported by the plurality of material support rollers, and a third guide roller arranged beneath the second guide roller in the vertical direction relative to the one or more rolls of material supported by the plurality of material support rollers, in a first taping configuration, the plurality of guide rollers may cooperate to guide tape over the first circumferential side of the first guide roller, the second circumferential side of the second guide roller, and the first circumferential side of the third guide roller to permit clockwise application of tape by at least one tape head assembly to the one or more rolls of material supported by the plurality of material support rollers, and, in a second taping configuration, the plurality of guide rollers may cooperate to guide tape over the second circumferential side of the first guide roller, the first circumferential side of the second guide roller, and the second circumferential side of the third guide roller to permit counterclockwise application of tape by at least one tape head assembly to the one or more rolls of material supported by the plurality of material support rollers.

In some embodiments, each of the plurality of tape head assemblies may include a casing located at a lowermost end of the tape head assembly in the vertical direction, a cutting arm pivotally coupled to the casing that includes a blade, and an actuator housed by the casing that is coupled to the cutting arm to drive rotation of the cutting arm relative to the casing to selectively cut tape with the blade during a taping operation. When each of the plurality of tape head assemblies applies tape in a clockwise direction to the one or more rolls of material in a first taping configuration, the actuator may be configured to drive rotation of the cutting arm relative to the casing between a home position, in which the cutting arm is at least partially covered by a first cover aligned with the casing in the vertical direction to resist tape from being cut with the cutting arm, and a cutting position, in which the cutting arm is not covered by the first cover to allow tape to be cut with the cutting arm. When each of the plurality of tape head assemblies applies tape in a counterclockwise direction to the one or more rolls of material in a second taping configuration, the actuator may be configured to drive rotation of the cutting arm relative to the casing between a home position, in which the cutting arm is at least partially covered by a second cover aligned with the casing in the vertical direction and arranged opposite the first cover to resist tape from being cut with the cutting arm, and a cutting position, in which the cutting arm is not covered by the second cover to allow tape to be cut with the cutting arm.

In some embodiments, each of the plurality of tape head assemblies may include a tape hub to support a roll of tape during a taping operation, a plurality of guide rollers to guide tape from the roll of tape supported on the tape hub circumferentially around the one or more rolls of material during the taping operation that includes a first guide roller, a second guide roller arranged beneath the first guide roller in a vertical direction relative to the tape hub, and a third guide roller arranged beneath the second guide roller in the vertical direction relative to the tape hub, and a plurality of air nozzles arranged in close proximity to the third guide roller. Each of the plurality of air nozzles may include a plurality of discharge ports to expel air to draw tape fragments, contaminants, or debris away from the one or more rolls of material during the taping operation, and the plurality of air nozzles may include first and second air nozzles arranged opposite one another relative to the third guide roller.

In some embodiments, each of the plurality of tape head assemblies may include a backing plate having a front surface and a back surface arranged opposite the front surface, an actuator coupled to the back surface of the backing plate, a plurality of guide tracks coupled to the front surface of the backing plate, a main plate to support a roll of tape during a taping operation that is coupled to the backing plate and the actuator, and a plurality of guide blocks affixed to the main plate such that each of the plurality of guide blocks receives one of the plurality of guide tracks to permit translation of the main plate relative to the backing plate in the vertical direction along the plurality of guide tracks. The actuator may drive vertical translation of the main plate relative to the backing plate between a raised position, in which the tape head assembly is spaced apart from the one or more rolls of material, and a lowered position, in which the tape head assembly is positioned in close proximity to the one or more rolls of material to facilitate application of tape to the one or more rolls by the tape head assembly.

According to another aspect of the present disclosure, a taping station to apply tape to one or more rolls of material may include a plurality of material support rollers and a plurality of tape head assemblies. The plurality of material support rollers may support the one or more rolls of material for rotation during a taping operation. The plurality of tape head assemblies may be supported for translation relative to one another in a longitudinal direction. The plurality of tape head assemblies may be configured to apply tape to the one or more rolls of material supported by the material support rollers at multiple locations along an axial length of each of the one or more rolls of material during the taping operation. Each of the plurality of tape head assemblies may include a casing located at a lowermost end of the tape head assembly in a vertical direction, a cutting arm pivotally coupled to the casing that includes a blade, and an actuator housed by the casing that is coupled to the cutting arm to drive rotation of the cutting arm relative to the casing to selectively cut tape with the blade during the taping operation.

In some embodiments, when each of the plurality of tape head assemblies applies tape to the one or more rolls of material during the taping operation, the actuator may be configured to drive rotation of the cutting arm relative to the casing between a home position, in which the cutting arm is at least partially covered by a cover aligned with the casing in the vertical direction to resist tape from being cut with the cutting arm, and a cutting position, in which the cutting arm is not covered by the cover to allow tape to be cut with the cutting arm. Additionally, in some embodiments, the taping station may be positioned downstream of a winding station to receive the one or more rolls of material from the winding station.

In some embodiments, each of the plurality of tape head assemblies may include a tape hub to support a roll of tape during the taping operation and a plurality of guide rollers spaced from one another in the vertical direction to guide tape from the roll of tape supported on the tape hub circumferentially around each of the one or more rolls of material during the taping operation that includes a first guide roller, a second guide roller arranged beneath the first guide roller in the vertical direction relative to the tape hub, and a third guide roller arranged beneath the second guide roller in the vertical direction relative to the tape hub. Each of the plurality of tape head assemblies may include a plurality of air nozzles arranged in close proximity to the third guide roller, each of the plurality of air nozzles may include a plurality of discharge ports to expel air to draw tape fragments, contaminants, or debris away from the one or more rolls of material during the taping operation, and the plurality of air nozzles may include first and second air nozzles arranged opposite one another relative to the third guide roller.

In some embodiments, each of the plurality of tape head assemblies may include a backing plate having a front surface and a back surface arranged opposite the front surface, an actuator coupled to the back surface of the backing plate, a plurality of guide tracks coupled to the front surface of the backing plate, a main plate supporting a roll of tape during the taping operation that is coupled to the backing plate and the actuator, a plurality of guide blocks affixed to the main plate such that each of the plurality of guide blocks receives one of the plurality of guide tracks to permit translation of the main plate relative to the backing plate in the vertical direction along the plurality of guide tracks, and a plurality of guide rollers supported by the main plate and including a first guide roller, a second guide roller, and a third guide roller to guide tape from the roll of tape supported by the main plate circumferentially around the one or more rolls of material during the taping operation. The actuator may drive vertical translation of the main plate relative to the backing plate between a raised position, in which the tape head assembly is spaced apart from the one or more rolls of material, and a lowered position, in which the tape head assembly is positioned in close proximity to the one or more rolls of material to facilitate application of tape to the one or more rolls by the tape head assembly.

According to yet another aspect of the present disclosure, a method of processing material may include wrapping material around a mandrel of a winder to produce one or more rolls of material, conveying the one or more rolls of material to a taping station arranged downstream of the winder, supporting a plurality of tape head assemblies of the taping station for translation relative to one another in a longitudinal direction, and applying tape to the one or more rolls of material with the plurality of tape head assemblies at multiple locations along an axial length of each of the one or more rolls of material.

In some embodiments, applying tape to the one or more rolls of material with the plurality of tape head assemblies may include securing rolls of tape with tape hubs of the plurality of tape head assemblies and guiding tape from the rolls of tape secured by the tape hubs circumferentially around the one or more rolls of material. Guiding tape from the rolls of tape secured by the tape hubs circumferentially around the one or more rolls of material may include guiding tape over a first guide roller, a second guide roller, and a third guide roller to permit clockwise or counterclockwise application of tape by the plurality of tape head assemblies to the one or more rolls of material, and the first guide roller, the second guide roller, and the third guide roller may be spaced from one another in a vertical direction and aligned along a vertical axis.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 2 is a partial front elevation view of a tape head assembly that may be included in the taping station shown in FIG. 1 which is configured to apply tape circumferentially to a roll of wound material in a clockwise (CW) direction;

FIG. 3 is a partial front elevation view of a tape head assembly that may be included in the taping station shown in FIG. 1 which is configured to apply tape circumferentially to a roll of wound material in a counterclockwise (CCW) direction;

FIG. 4 is a magnified elevation view of a portion of the tape head assembly of FIG. 2 depicting movement of a cutting arm of the tape head assembly between a home position and a cutting position;

FIG. 5 is a magnified elevation view of a portion of the tape head assembly of FIG. 3 depicting movement of a cutting arm of the tape head assembly between a home position and a cutting position;

DETAILED DESCRIPTION OF ILLUSTRATIVE EMBODIMENTS

Figure 1:
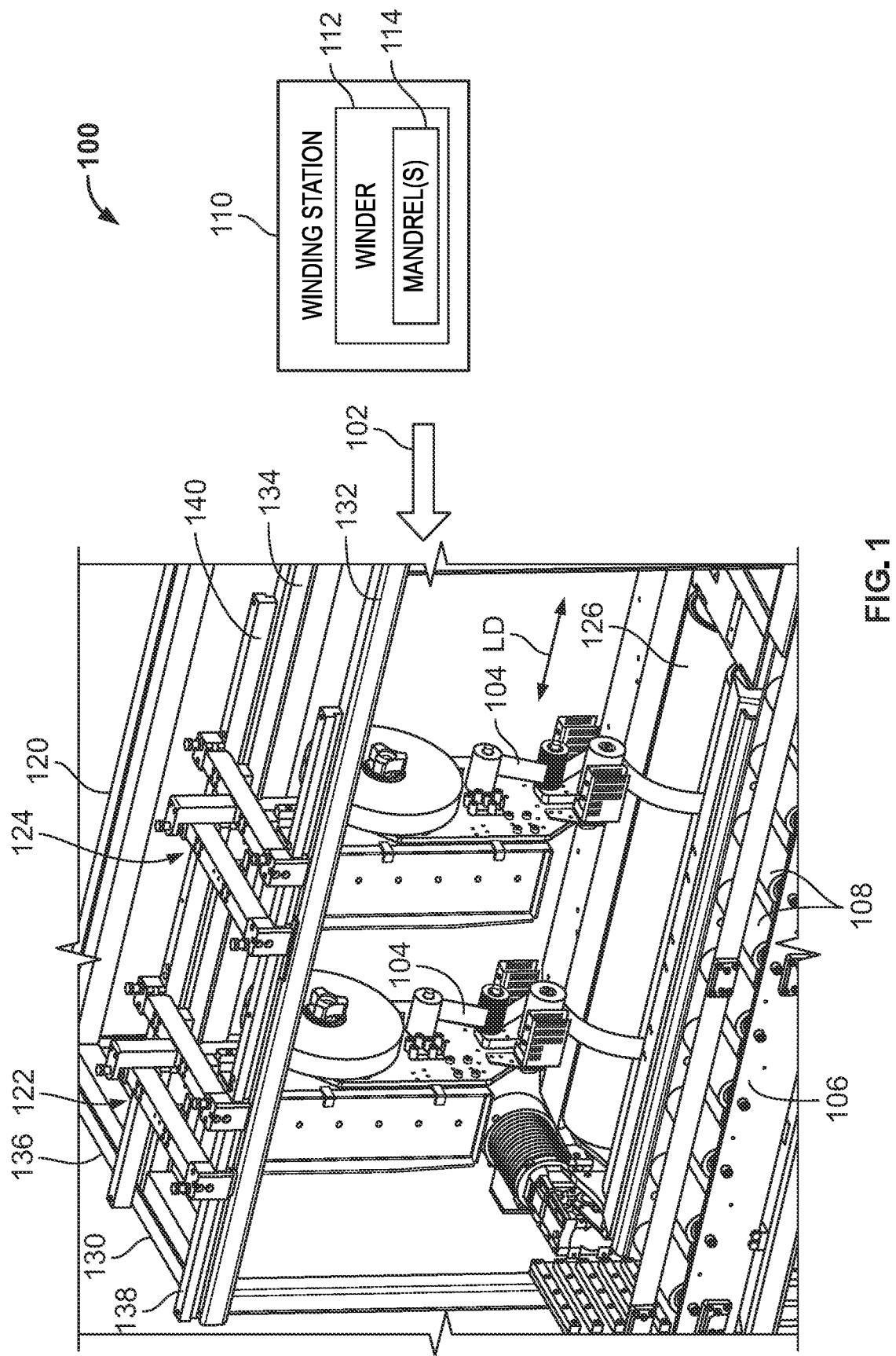
FIG. 1 is a partial diagrammatic depiction of a winding station arranged upstream of a taping station according to at least one embodiment of the disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative system 100 for processing material includes a winding station 110 and a taping station 120. In the illustrative embodiment, the winding station 110 includes a winder 112 that includes one or more mandrels 114. The illustrative taping station 120 includes multiple tape head assemblies 122, 124 that are substantially identical to one another and supported for linear translation relative to one another in a longitudinal direction LD. In addition, as described in greater detail below with reference to FIGS. 2 and 3, the taping station 120 includes material support rollers 202, 204 that are configured to support one or more rolls of material beneath the tape head assemblies 122, 124 during a taping operation.

It should be appreciated that the winding station 110 is configured to produce rolls of wound material in use of the system 100. The illustrative winder 112 includes, or is otherwise embodied as, any device or collection of devices capable of winding and/or wrapping material into rolls having a cylindrical shape. In one example, material may be wound and/or wrapped around the one or more mandrels 114 of the winder 112 to produce the rolls of material. Of course, it should be appreciated that the winder 112 may include any other device(s) suitable to wind and/or wrap material in lieu of, or in addition to, the mandrel(s) 114.

In the illustrative system 100, the taping station 120 is arranged downstream of the winding station 110 as suggested by arrow 102. As such, in use of the system 100, the taping station 120 receives rolls of material from the winding station 110 and applies tape 104 to the rolls of material via the tape head assemblies 122, 124 during a taping operation. Provision of multiple tape head assemblies (e.g., the tape head assemblies 122, 124) permits application of tape 104 to one or more rolls of material at multiple locations along an axial length of each of the one or more rolls of material during a taping operation.

In some embodiments, a conveyance mechanism may be provided to convey rolls of material produced by the winding station 110 to the taping station 120 for subsequent processing. As shown in FIG. 1, a conveyor 106 including conveyor rollers 108 is configured to convey rolls of material from the winding station 110 to the taping station 120. Of course, in other embodiments, it should be appreciated that other suitable mechanism(s) may be employed to convey rolls of material from the winding station 110 to the taping station 120. In some configurations, rolls of material conveyed to the taping station 120 by the conveyor 106 may be moved laterally (i.e., in a direction perpendicular to the longitudinal direction LD) to position the rolls of material beneath the tape head assemblies 122, 124. For ease of illustration, one roll of material 126 is depicted beneath the tape head assemblies 122, 124 in FIG. 1.

The illustrative system 100 is configured to process roofing material that may be provided in the form of continuous, relatively flexible sheets, at least in some embodiments. As such, the winding station 110 is configured to produce rolls of roofing material and the taping station 120 is configured to receive the rolls of roofing material from the winding station 110 and apply tape 104 to the rolls of roofing material. However, it should be appreciated that the system 100 is capable of processing any material that may be wound using the winding station 110 and taped using the taping station 120.

The illustrative taping station 120 includes a cage 130 defining an enclosure in which the tape head assemblies 122, 124 are slidably positioned. In the illustrative embodiment, the cage 130 at least partially houses the conveyor 106. The cage 130 includes elongated beams 132, 134 that extend in the longitudinal direction LD to at least partially define a roof 136 of the cage 130. Guide rails 138, 140 are affixed to corresponding beams 132, 134 such that the guide rails 138, 140 extend in the longitudinal direction LD along the beams 132, 134. The tape head assemblies 122, 124 are configured for linear translation along the guide rails 138, 140 to adjust the longitudinal position of the tape head assemblies 122, 124 during a taping operation and thereby modify the locations at which tape 104 is applied to the roll of material 126 along the axial length thereof.

Referring now to FIG. 2, the tape head assembly 122 is positioned above a roll of material (not shown in the figure) in a vertical direction VD to apply tape 104 to the roll of material during a taping operation. It should be appreciated that the roll of material is supported for rotation about a rotational axis RA by the material support rollers 202, 204. As discussed in greater detail below, the tape head assembly 122 is configured to apply tape 104 to the roll of material in a clockwise direction (CW) in a taping configuration 210 thereof.

In the illustrative embodiment, the tape head assembly 122 includes a tape hub 222 and guide rollers 224, 230, 236 that are spaced from one another in the vertical direction VD. The tape hub 222 is configured to support a roll of tape 104 during a taping operation. The guide rollers 224, 230, 236 are cooperatively configured to guide tape 104 from the roll of tape 104 supported on the tape hub 222 circumferentially around the roll of material in the clockwise direction in the taping configuration 210. Each of the tape hub 222 and the guide rollers 224, 230, 236 is supported by, and extends outwardly from, a main plate 250 of the tape head assembly 122.

The illustrative guide roller 224 of the tape head assembly 122 has a first circumferential side 226 and a second circumferential side 228 arranged opposite the first circumferential side 226. The illustrative guide roller 230 of the tape head assembly 122 has a first circumferential side 232 and a second circumferential side 234 arranged opposite the first circumferential side 232. The illustrative guide roller 236 of the tape head assembly 122 has a first circumferential side 238 and a second circumferential side 240 arranged opposite the first circumferential side 238.

In the illustrative embodiment, the guide roller 230 is arranged beneath the guide roller 224 in the vertical direction VD relative to the roll supported by the material support rollers 202, 204 and relative to the tape hub 222. The guide roller 236 is illustratively arranged beneath the guide roller 230 in the vertical direction VD relative to the roll supported by the material support rollers 202, 204 and relative to the tape hub 222. The guide rollers 224, 230, 236 are illustratively aligned along a vertical axis 242.

In the illustrative taping configuration 210 of the tape head assembly 122, the guide rollers 224, 230, 236 cooperate to guide tape 104 from the roll of tape 104 supported on the tape hub 222 circumferentially around the roll of material supported by the material support rollers 202, 204 in the clockwise direction as indicated above. More specifically, in the taping configuration 210 of the tape head assembly 122, the rollers 224, 230, 236 cooperate to guide tape 104 over the first circumferential side 226 of the guide roller 224, the second circumferential side 234 of the guide roller 230, and the first circumferential side 238 of the guide roller 236 to permit clockwise application of tape 104 to the roll supported by the material support rollers 202, 204 by the tape head assembly 122.

Referring now to FIG. 3, an illustrative taping configuration 300 of the tape head assembly 122 is shown. In the taping configuration 300, the guide rollers 224, 230, 236 cooperate to guide tape 104 from the roll of tape 104 supported on the tape hub 222 circumferentially around the roll of material supported by the material support rollers 202, 204 in a counterclockwise (CCW) direction. More specifically, in the taping configuration 300 of the tape head assembly 122, the rollers 224, 230, 236 cooperate to guide tape 104 over the second circumferential side 228 of the guide roller 224, the first circumferential side 232 of the guide roller 230, and the second circumferential side 240 of the guide roller 236 to permit counterclockwise application of tape 104 to the roll supported by the material support rollers 202, 204 by the tape head assembly 122. It should be appreciated that the taping configurations 210, 300 of the tape head assembly 122 may be implemented according to the requirements of a particular taping operation and/or application.

Figure 12:
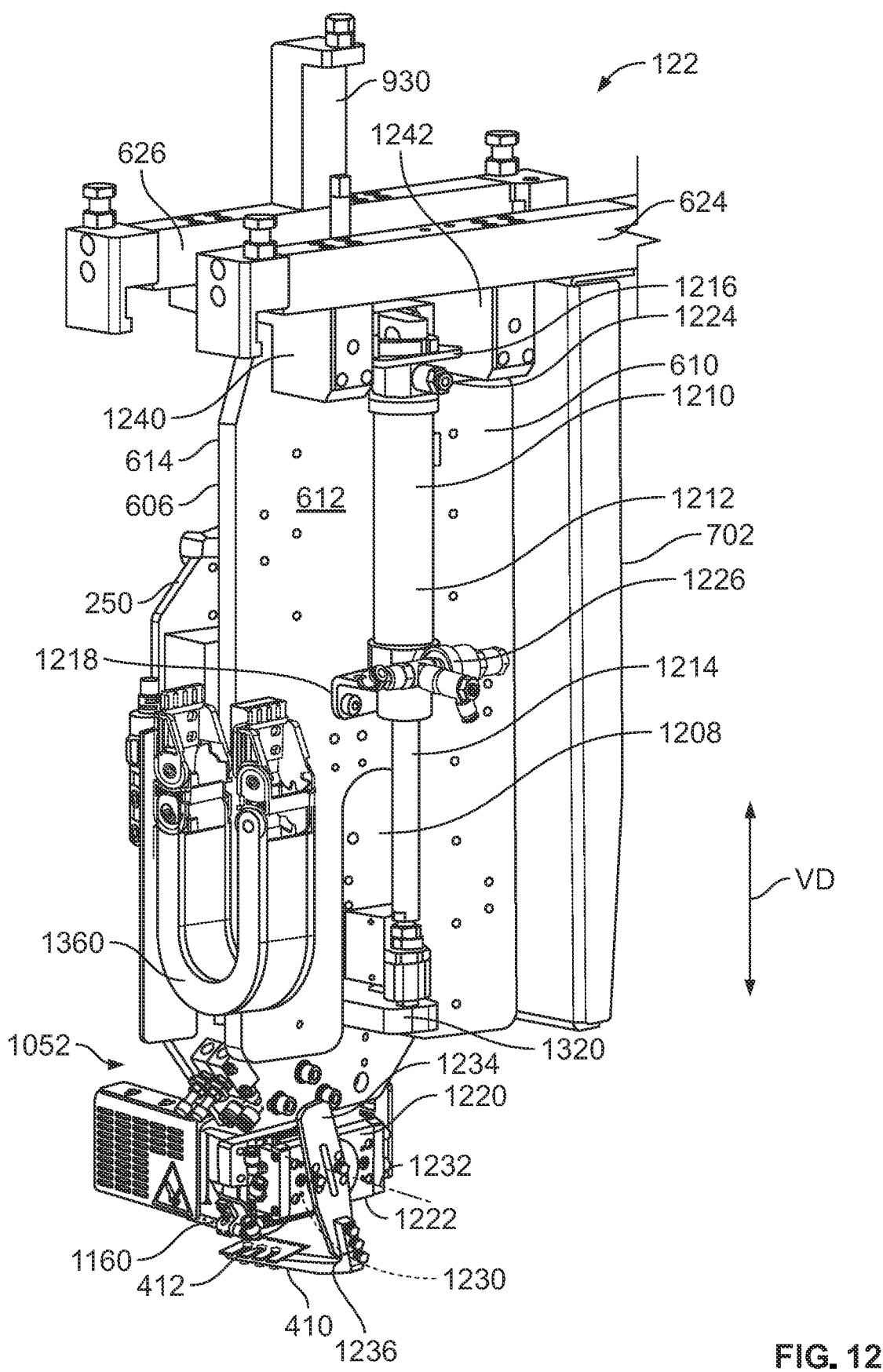
FIG. 12 is a rear perspective view of the tape head assembly of FIG. 11.

Referring now to FIG. 4, a magnified view of the tape head assembly 122 in the taping configuration 210 is shown. The illustrative tape head assembly 122 includes a casing 1220 (see FIG. 12), a cutting arm 410 pivotally coupled to the casing 1220, and an actuator 1230 (shown in phantom) housed by the casing 1220. As best seen in FIG. 12, the casing 1220 is located at a lowermost end 1222 of the tape head assembly 122 in the vertical direction VD. The cutting arm 410, which is also shown in FIG. 12, include a blade 412. The actuator 1230 is coupled to the cutting arm 410 to drive rotation of the cutting arm 410 relative to the casing 1220 to selectively cut tape 104 with the blade 412 during a taping operation.

The tape head assembly 122 illustratively includes covers 420, 430 that are each at least partially aligned with the casing 1220 in the vertical direction VD. As best seen in FIG. 4, the covers 420, 430 are sized to receive and thereby cover the cutting arm 410 and the blade 412 to resist tape 104 from being cut by the cutting arm 410. The covers 420, 430 are arranged opposite one another relative to the guide roller 236. More specifically, the cover 420 is arranged closer to the first circumferential side 238 of the guide roller 236 than the second circumferential side 240, and the cover 430 is arranged closer to the second circumferential side 240 of the guide roller 236 than the first circumferential side 238 of the guide roller 236. The covers 420, 430 are also aligned at least partially with the guide roller 236 in the vertical direction VD.

When the tape head assembly 122 applies tape 104 in the clockwise direction to the roll supported on the material support rollers 202, 204 in the taping configuration 210, the actuator 1230 is configured to drive rotation of the cutting arm 410 relative to the casing 1220 between a home position 414 and a cutting position 416. For ease of illustration, both the home and cutting positions 414, 416 are depicted in FIG. 4. In the home position 414, the cutting arm 410 and the blade 412 are at least partially covered by the cover 430 to resist tape 104 from being cut by the cutting arm 410. In the cutting position 416, the cutting arm 410 and the blade 412 are not covered by the cover 430 to allow tape 104 to be cut by the cutting arm 410. An angle α defines an angular displacement of the cutting arm 410 between the home position 414 and the cutting position 416.

Referring now to FIG. 5, a magnified view of the tape head assembly 122 in the taping configuration 300 is shown.

When the tape head assembly 122 applies tape 104 in the counterclockwise direction to the roll supported on the material support rollers 202, 204 in the taping configuration 300, the actuator 1230 is configured to drive rotation of the cutting arm 410 relative to the casing 1220 between a home position 510 and a cutting position 512. For ease of illustration, both the home and cutting positions 510, 512 are depicted in FIG. 5. In the home position 510, the cutting arm 410 and the blade 412 are at least partially covered by the cover 420 to resist tape 104 from being cut by the cutting arm 410. In the cutting position 512, the cutting arm 410 and the blade 412 are not covered by the cover 420 to allow tape 104 to be cut by the cutting arm 410. An angle β defines an angular displacement of the cutting arm 410 between the home position 510 and the cutting position 512. In the illustrative embodiment, the angle α and the angle β are equal or substantially equal to one another.

Figure 6:
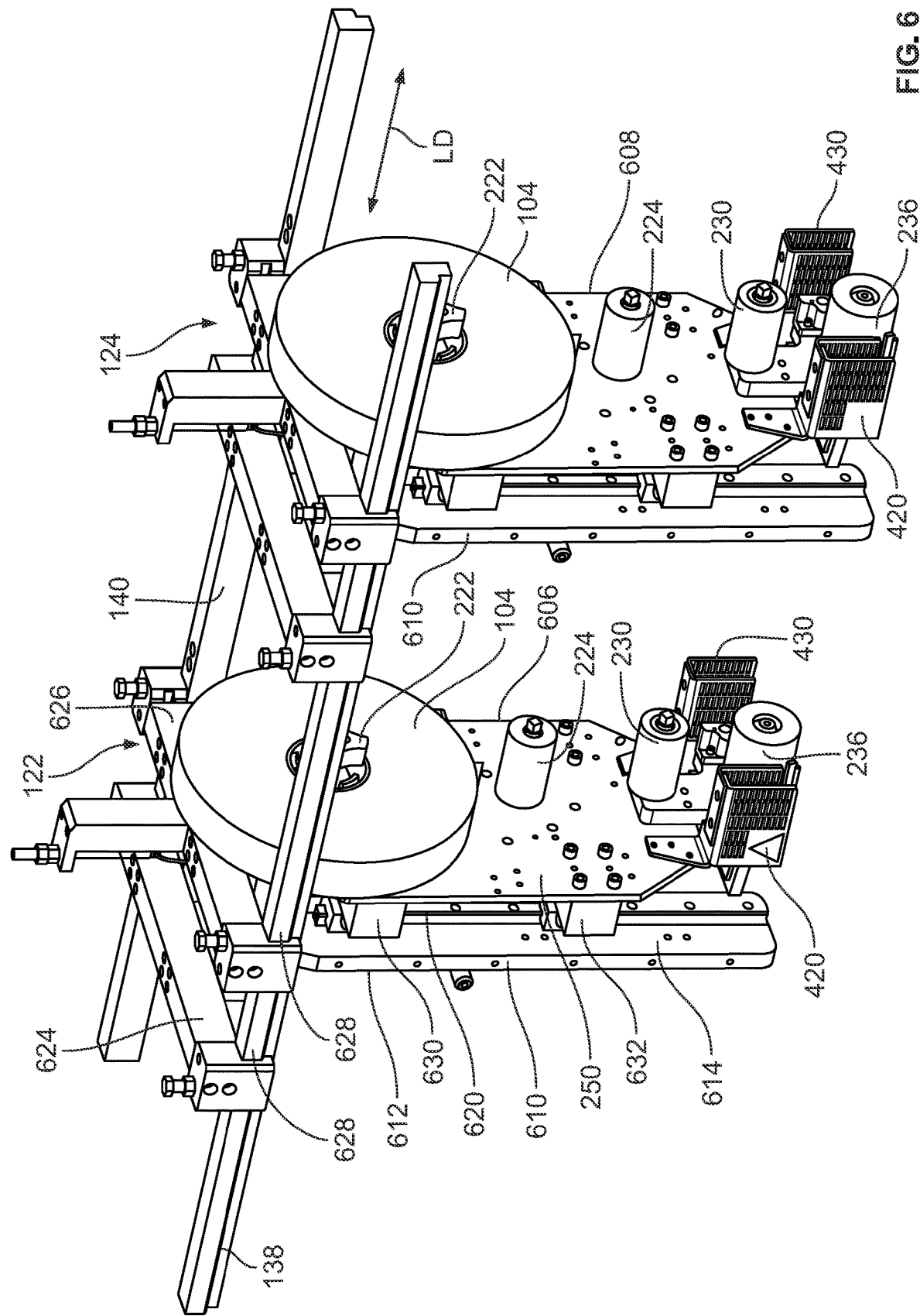
FIG. 6 is a perspective view of a portion of the taping station shown in FIG. 1 that includes two tape head assemblies supported for movement relative to one another in a longitudinal direction according to at least one embodiment of the disclosure.

Referring now to FIG. 6, the tape head assemblies 122, 124 are shown supported on the guide rails 138, 140 with the cage 130 of the taping station 120 (and the corresponding beams 132, 134) omitted for the sake of simplicity. Additionally, the tape head assemblies 122, 124 are depicted in FIG. 6 without any cover panels (such as the cover panels 702, 704 shown in FIG. 7) so as to expose components that may be obscured by the cover panels. As the tape head assemblies 122, 124 are identical to one another as indicated above, discussion of the tape head assembly 124 below is largely omitted for the sake of brevity.

As mentioned above, the tape head assemblies 122, 124 are supported on the guide rails 138, 140 for linear translation relative to one another in the longitudinal direction LD. The tape head assembly 122 includes guide clips 624, 626 having grooves 628 formed in opposite ends thereof to receive the guide rails 138, 140 such that the guide clips 624, 626 extend laterally between the guide rails 138, 140. At least in some embodiments, the spacing of the guide clips 624, 626 relative to one another in the longitudinal direction LD is dictated by the positional arrangement of various components of the tape head assembly 122, such as the main plate 250 and a backing plate 610 coupled to the main plate 250, for example. In any case, at least in part, the guide clips 624, 626 cooperatively support the tape head assembly 122 for linear translation along the guide rails 138, 140.

In the illustrative embodiment, two tape head assemblies 122, 124 are positioned on the guide rails 138, 140 to apply tape 104 to a roll of material during a taping operation. In other embodiments, however, another suitable number of tape head assemblies may be positioned on the guide rails 138, 140 in the same fashion as the tape head assemblies 122, 124. In one example, three tape head assemblies may be positioned on the guide rails 138, 140 to apply tape 104 at three locations along an axial length of each roll of material during a taping operation. In another example, more than three tape head assemblies may be positioned on the guide rails 138, 140 to apply tape 104 at more than three locations along an axial length of each roll of material during a taping operation. In yet another example, only one tape head assembly may be positioned on the guide rails 138, 140 to apply tape 104 at one location along an axial length of each roll of material during a taping operation.

Figure 9:
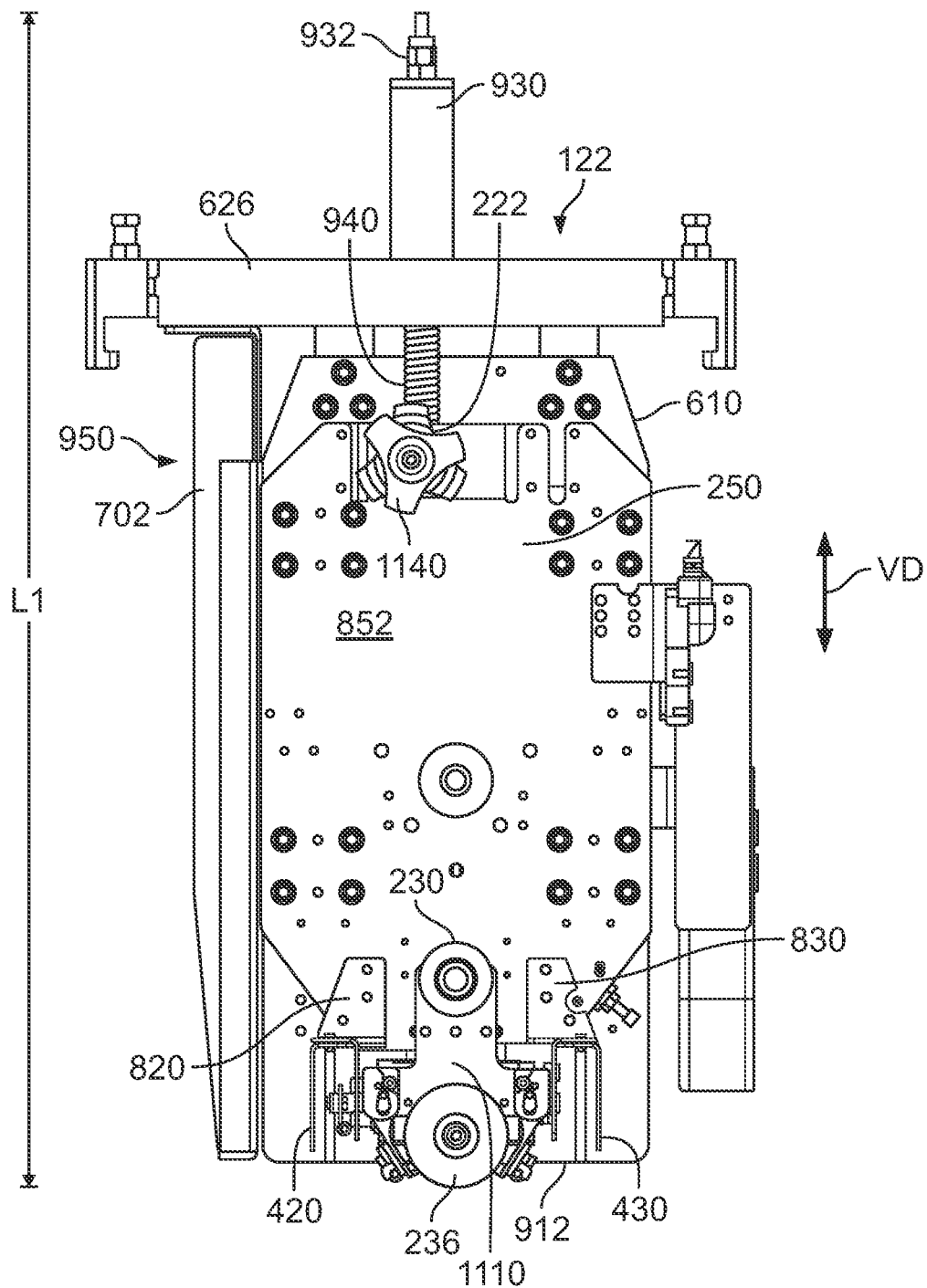
FIG. 9 is a front elevation view of the tape head assembly shown in FIG. 8 with the roll of tape removed from the tape hub and the tape head assembly depicted in a raised position.
Figure 10:
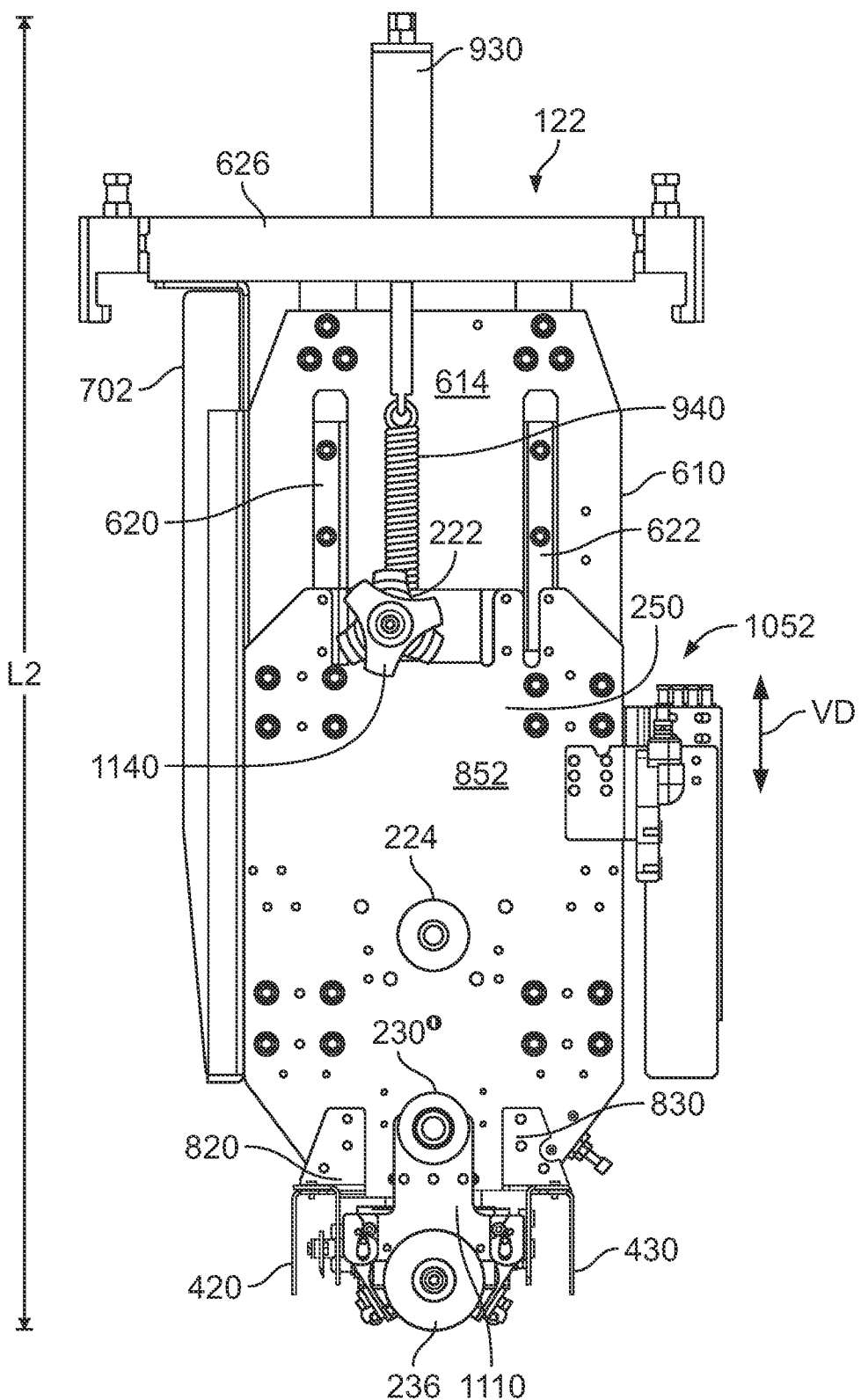
FIG. 10 is a front elevation view of the tape head assembly shown in FIG. 9 with the tape head assembly depicted in a lowered position.

The illustrative tape head assembly 122 includes the backing plate 610 and the main plate 250 as mentioned above. As best seen in FIGS. 9 and 10 and described in greater detail below, the main plate 250 is slidably coupled to the backing plate 610 for movement relative to the backing plate 610 in the vertical direction VD. Movement of the main plate 250 relative to the backing plate 610 in the vertical direction VD is illustratively driven by an actuator 1210 (see FIG. 12) coupled to a back surface 612 of the backing plate 610 and the main plate 250, as further discussed below.

The illustrative tape head assembly 122 includes guide tracks 620, 622 coupled to a front surface 614 of the backing plate 610 that is arranged opposite the back surface 612. In the illustrative embodiment, only two guide tracks 620, 622 are included in the tape head assembly 122. However, in other embodiments, another suitable number of guide tracks may be included in the tape head assembly 122. In any case, the tape head assembly 122 includes guide blocks (only guide blocks 630, 632 are shown in FIG. 6) that are disposed in confronting relation with the guide tracks 620, 622.

The guide blocks are illustratively affixed to the main plate 250 such that each of the guide blocks receives one of the guide tracks 620, 622 to permit translation of the main plate 250 relative to the backing plate 610 along the guide tracks 620, 622. The guide blocks 630, 632 receive the guide track 620 and another pair of guide blocks (not shown) receive the guide track 622. As such, the tape head assembly 122 includes four guide blocks and two guide tracks, at least in some embodiments. Of course, in other embodiments, the tape head assembly 122 may include another suitable number of guide blocks and guide tracks.

Figure 7:
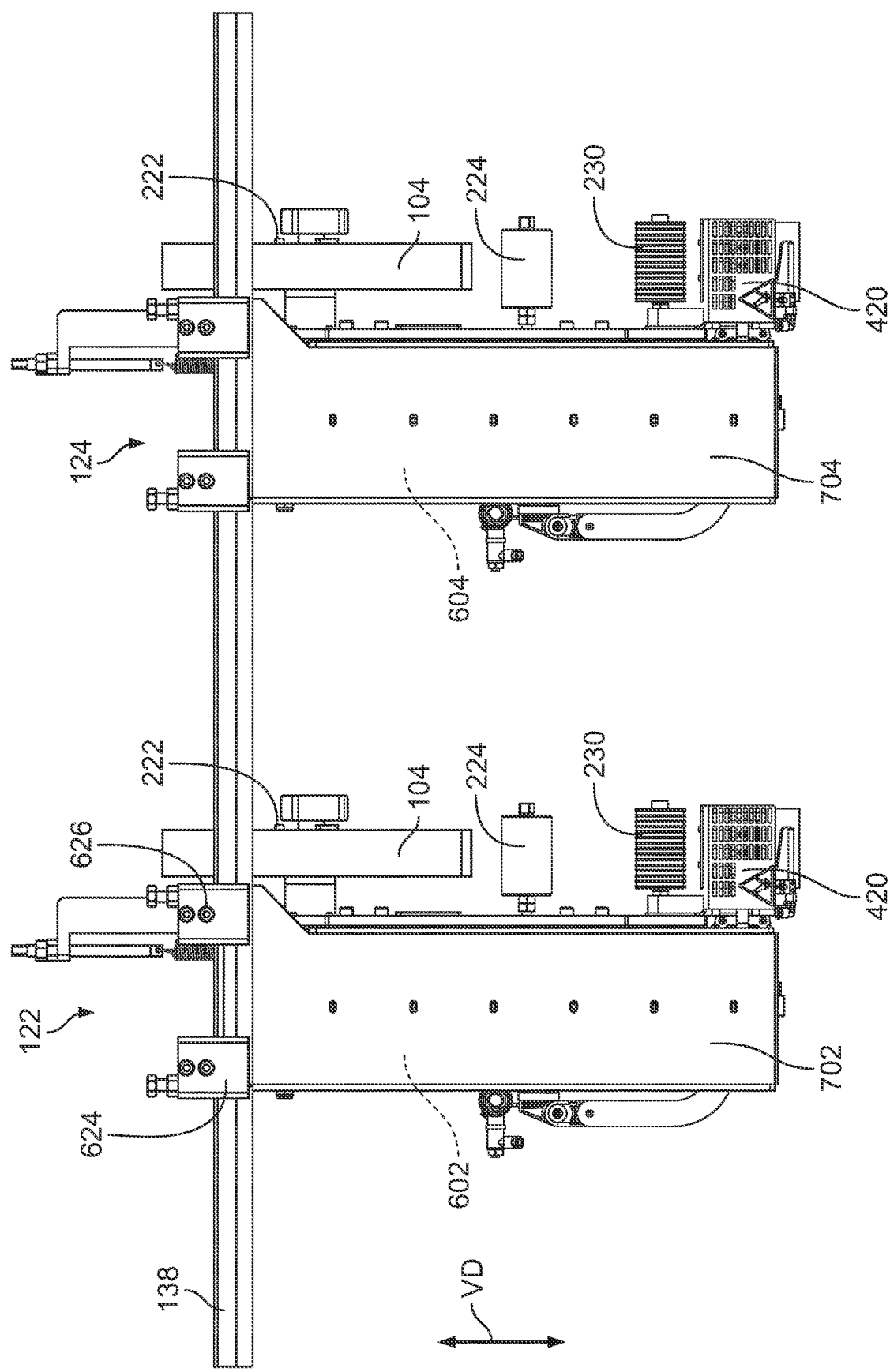
FIG. 7 is a side elevation view of the two tape head assemblies depicted in FIG. 6 each having a housing that at least partially houses the tape head assembly.

Referring now to FIG. 7, some components of the tape head assemblies 122, 124 are at least partially covered by respective cover panels 702, 704 of the tape head assemblies 122, 124. The illustrative cover panels 702, 704 at least partially cover corresponding sides 602, 604 (shown in phantom) of the tape head assemblies 122, 124. Each cover panel (e.g., the cover panel 702) extends in the vertical direction VD from the casing 1220 to the guide rail 138 coupled to the guide clips 624, 626. In some embodiments, cover panels (not shown) may be employed to cover sides 606, 608 of the tape head assemblies 122, 124 that are arranged opposite the sides 602, 604. It should be appreciated that the covers panels 702, 704 may include, or otherwise be embodied as, outer housings of the tape head assemblies 122, 124, at least in some embodiments.

Figure 8:
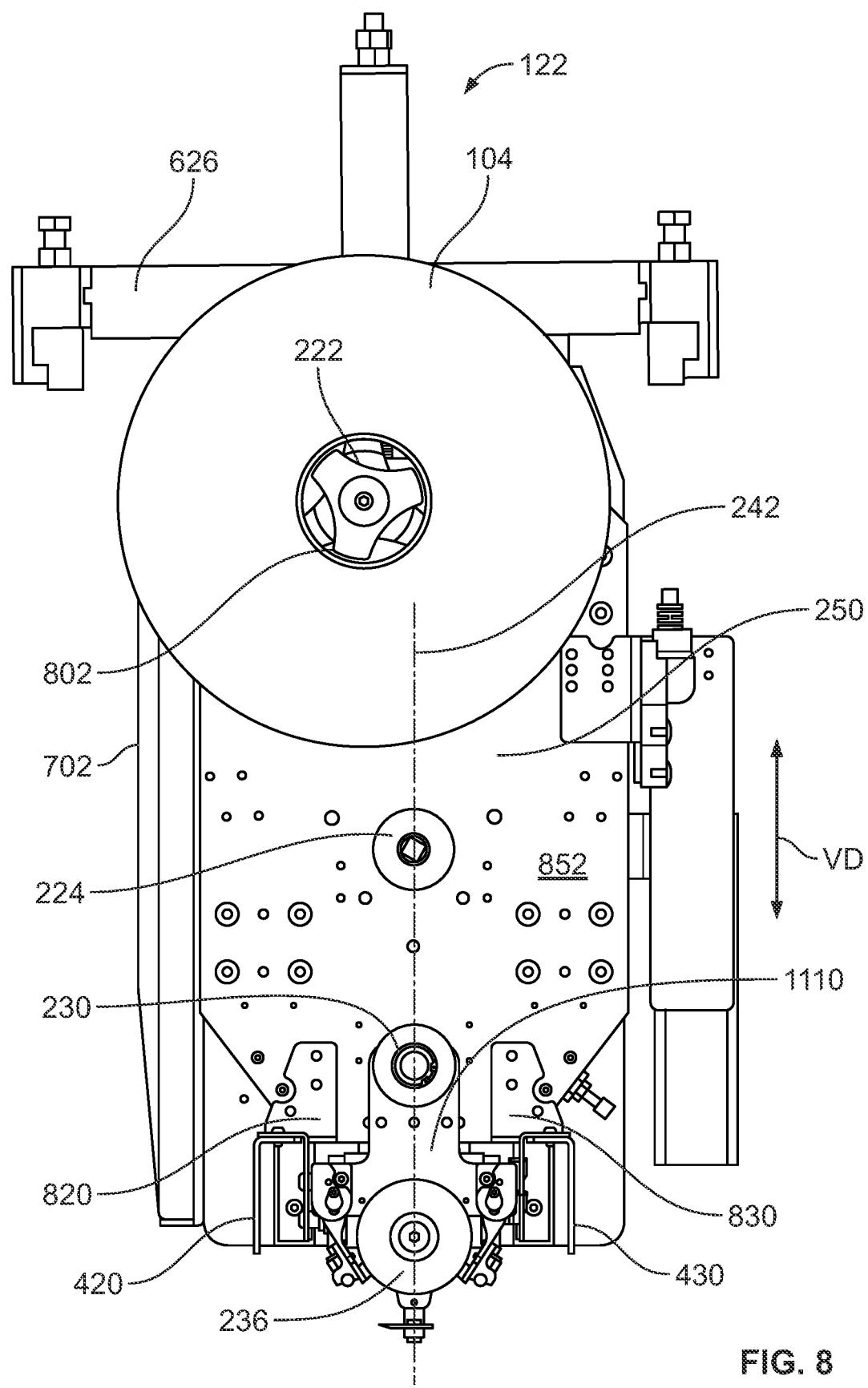
FIG. 8 is a front elevation view of a tape head assembly that may be included in the taping station shown in FIG. 1 with a roll of tape supported by a tape hub of the tape head assembly.

Referring now to FIGS. 8 and 9, the tape head assembly 122 is depicted with a roll of tape 104 supported by the tape hub 222 (see FIG. 8) and without a roll of tape 104 supported by the tape hub 222 (see FIG. 9) for the sake of clarity. When the roll of tape 104 is supported by the tape hub 222 of the tape head assembly 122, the tape hub 222 is at least partially positioned in a central aperture 802 of the roll of tape 104 such that the tape hub 222 is at least partially surrounded by the roll of tape 104. Additionally, when the roll of tape 104 is supported by the tape hub 222, the roll of tape 104 is substantially aligned with the guide rolls 224, 230, 236 along the vertical axis 242.

Figure 11:
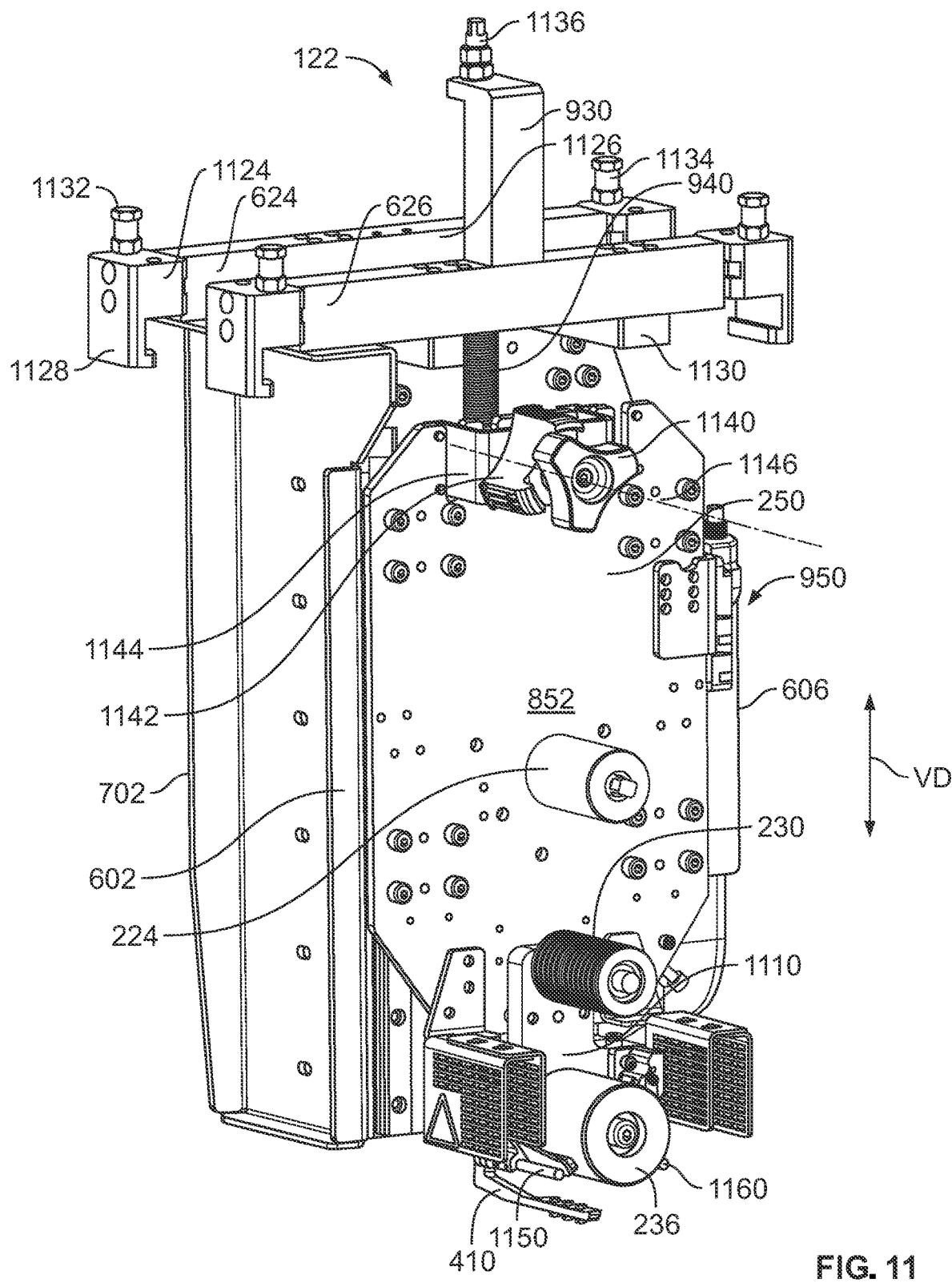
FIG. 11 is a front perspective view of one tape head assembly that may be included in the taping station shown in FIG. 1.

In the illustrative embodiment, the guide rollers 224, 230, 236 are supported by the main plate 250 of the tape head assembly 122 such that the guide rollers 224, 230, 236 extend outwardly from a front surface 852 of the main plate 250. The guide roller 224 directly contacts the front surface 852 without any other component or structure interposed between the guide roller 224 and the front surface 852. The guide rollers 230, 236 are mounted to, and directly contact, a mounting tee or holder 1110 of the tape head assembly 122, as best seen in FIG. 11. The mounting tee 1110 is directly connected to the front surface 852 of the main plate 250 and aligned with the casing 1220 in the vertical direction VD.

The illustrative covers 420, 430 are coupled to the front surface 852 of the main plate 250. More specifically, the cover 420 directly contacts a mounting bracket 820 of the tape head assembly 122 that is directly connected to the front surface 852, and the cover 430 directly contacts a mounting bracket 830 of the tape head assembly 122 that is directly connected to the front surface 852 as shown in FIGS. 8-11. In this arrangement, the covers 420, 430 are supported by the respective mounting brackets 820, 830 on opposite sides of the guide rollers 230, 236. The covers 420, 430 are aligned with the guide roller 236 in the vertical direction VD, and the mounting brackets 820, 830 are aligned with the guide roller 230 in the vertical direction VD.

When the roll of tape 104 is removed from the tape hub 222 as shown in FIG. 9, a nut 1140 (see FIG. 11) of the tape hub 222 is slightly offset from the vertical axis 242 along which the guide rollers 224, 230, 236 are aligned. As best seen in FIGS. 9-11 and 13, in the illustrative embodiment, the main plate 250 is coupled to a mounting post 930 of the tape head assembly 122 via a spring or biasing element 940. The illustrative mounting post 930 is integrally formed with, and/or interconnected with, the guide clip 626, as best seen in FIGS. 6 and 11. The mounting post 930 extends above the guide clip 626 in the vertical direction VD to define an uppermost end 932 of the tape head assembly 122 in the vertical direction VD.

Referring now to FIGS. 9 and 10, as mentioned above, the actuator 1210 is configured to drive linear translation of the main plate 250 relative to the backing plate 610 in the vertical direction VD in use of the tape head assembly 122. More specifically, in the illustrative embodiment, the actuator 1210 is configured to drive vertical translation of the main plate 250 relative to the backing plate 610 between a raised position 950 (shown in FIG. 9) and a lowered position 1052 (shown in FIG. 10). The spring 940 illustratively biases the main plate 250 toward the raised position 950. As best seen in FIG. 10, movement of the main plate 250 relative to the backing plate 610 along the guide tracks 620, 622 toward the lowered position 1052 causes extension of the spring 940. Conversely, movement of the main plate 250 relative to the backing plate 610 along the guide tracks 620, 622 toward the raised position 950 causes retraction of the spring 940.

When the main plate 250 is in the raised position 950, the illustrative tape head assembly 122 has a length L1 in the vertical direction VD. When the main plate 250 is in the lowered position 1052, the illustrative tape head assembly 122 has a length L2 in the vertical direction VD. The length L2 is illustratively greater than the length L1. Due at least in part to the increased vertical profile of the tape head assembly 122 in the lowered position 1052, the tape head assembly 122 may be positioned in closer proximity to a roll of material (not shown) supported by the material support rollers 202, 204 when the main plate 250 is in the lowered position 1052 than when the main plate 250 is in the raised position 950, at least in some embodiments.

In some embodiments, when the main plate 250 is in the raised position 950, the main plate 250 is spaced apart in the vertical direction VD from a roll of material supported by the material support rollers 202, 204. Therefore, the raised position 950 of the main plate 250 may be associated with, or otherwise correspond to, a transitional/startup position and/or state of the tape head assembly 122 during which tape 104 is not applied to a roll of material by the tape head assembly 122, at least in some embodiments. In one example, the raised position 950 of the main plate 250 may be associated with, or otherwise correspond to, a startup state of the tape head assembly 122 that occurs prior to a taping operation. In another example, the raised position 950 of the main plate 250 may be associated with, or otherwise correspond to, a transitional state of the tape head assembly 122 that occurs between taping cycles.

Additionally, in some embodiments, when the main plate 250 is in the lowered position 1052, the main plate 250 is positioned in close proximity to a roll of material supported by the material support rollers 202, 204 to facilitate application of tape 104 to the roll of material by the tape head assembly 122. As such, at least in comparison to the raised position 950 of the main plate 250, the lowered position 1052 of the main plate 250 may be associated with, or otherwise correspond to, a deployed position and/or state of the tape head assembly 122 during which the tape head assembly 122 is operative to apply tape 104 to a roll of material, at least in some embodiments.

In some embodiments still, the raised position 950 of the main plate 250 may be associated with, or otherwise correspond to, a position and/or state of the tape head assembly 122 in which tape 104 is first applied to a roll of material. Put another way, the raised position 950 of the main plate 250 may be associated with, or otherwise correspond to, an initial phase of a taping cycle performed by the tape head assembly 122. In such embodiments, vertical movement of the main plate 250 relative to the backing plate 610 away from the raised position 950 and toward the lowered position 1052 may correspond to, or otherwise be associated with, continued performance of a taping cycle by the tape head assembly 122. Furthermore, in such embodiments, the lowered position 1052 of the main plate 250 may be associated with, or otherwise correspond to, a last or final phase of a taping cycle performed by the tape head assembly 122.

As best seen in FIG. 9, when the main plate 250 is in the raised position 950, the guide roller 236 and the covers 420, 430 are aligned in the vertical direction VD with a lowermost end 912 of the backing plate 610. The guide roller 236 and the covers 420, 430 are also aligned in the vertical direction VD with the cover panel 702 when the main plate 250 is in the raised position 950. In contrast, when the main plate 250 is in the lowered position 1052, the guide roller 236 and the covers 420, 430 extend below the end 912 of the backing plate 610 in the vertical direction VD such that the end 912 is obscured by the main plate 250 as shown in FIG. 10. In addition, when the main plate 250 is in the lowered position 1052, the guide roller 236 and the covers 420, 430 extend below the cover panel 702 in the vertical direction VD.

Referring now to FIG. 11, a front perspective view of the tape head assembly 122 is shown with the main plate 250 in, or substantially in, the raised position 950. For ease of illustration, the guide rails 138, 140 and the roll of tape 104 are omitted from FIGS. 11 and 12 and the cutting arm 410 is depicted in the cutting position (i.e., the cutting position 416 or the cutting position 512). The cover panel 702 is illustrated in FIG. 11 as at least partially covering the side 602 of the tape head assembly 122. As depicted in FIGS. 11 and 12, the side 606 of the tape head assembly 122 arranged opposite the side 602 is not covered by a cover panel.

In the illustrative embodiment, the guide clips 624, 626 may be said to cooperatively provide, or otherwise be embodied as, an upper bridge 1124 of the tape head assembly 122. The upper bridge 1124 is configured for interaction with a support structure (e.g., the guide rails 138, 140) to suspend the tape head assembly 122 above the material support rollers 202, 204 in the vertical direction VD. The guide clips 624, 626 are substantially identical to one another. Using the guide clip 624 as an example, the guide clip 624 includes a crossbar 1126 and retainer clips 1128, 1130 arranged at opposite ends of the crossbar 1126 that are configured to receive the guide rails 138, 140.

The guide clip 624 includes position adjustment screws 1132, 1134 that are coupled to respective retainer clips 1128, 1130. The position adjustment screws 1132, 1134 may be used to at least partially secure the tape head assembly 122 in a particular position along the guide tracks 138, 140 during a taping operation. The mounting post 930 is interconnected with the guide clip 626 and directly connected to the spring 940. To adjust the pressure and/or compression of the spring 940, a pressure adjustment screw 1136 is provided on the mounting post 930.

In the illustrative embodiment, the tape hub 222 includes the nut 1140, a hub bearing 1142 coupled to the nut 1140, and a hub block 1144 coupled to the nut 1140 and the hub bearing 1142. The nut 1140, the hub bearing 1142, and the hub block 1144 are aligned along a longitudinal axis 1146. The nut 1140 and the hub bearing 1142 are configured for rotation about the longitudinal axis 1146, and the hub block 1144 is constrained against rotation about the longitudinal axis 1146.

When a roll of tape 104 is supported by the tape hub 222, the nut 1140 is positioned outwardly of the roll of tape 104 to block outward movement of the roll of the tape 104 beyond the nut 1140 along the longitudinal axis 1146. The nut 1140 may be said to provide a first stop constraining outward axial movement of the roll of tape 104 along the longitudinal axis 1146. The nut 1140 may also be tightened or loosened to adjust the tension of a roll of tape 104 supported on the tape hub 222. Additionally, when a roll of tape 104 is supported by the tape hub 222, the hub bearing 1142 is positioned in the central aperture 802 to support the roll of tape 104 for rotation about the longitudinal axis 1146. The hub block 1144 is illustratively affixed to the front surface 852 of the main plate 250 and thereby constrained against rotation about the axis 1146. The hub block 1144 may be said to provide a second stop constraining inward axial movement of the roll of the tape 104 along the longitudinal axis 1146.

The illustrative tape head assembly 122 includes identical air nozzles 1150, 1160 arranged in close proximity to the guide roller 236. In particular, the air nozzles 1150, 1160 are arranged opposite one another on opposite sides of the guide roller 236. In the illustrative embodiment, only two air nozzles 1150, 1160 are included in the tape head assembly 122. However, in other embodiments, it should be appreciated that the tape head assembly 122 may include another suitable number of air nozzles.

Figure 14:
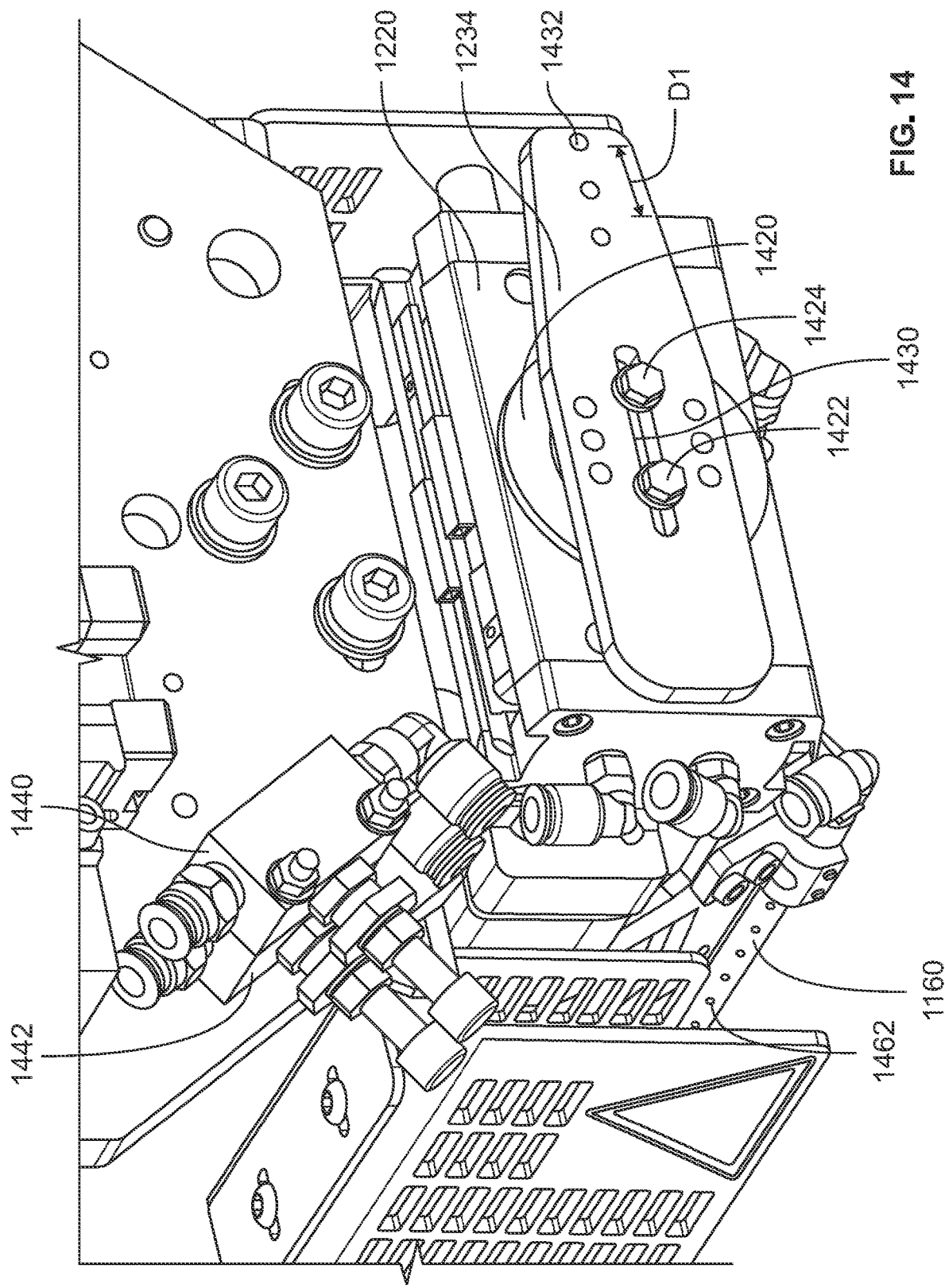
FIG. 14 is a magnified perspective view of one portion of the tape head assembly of FIG. 12.

Each of the air nozzles 1150, 1160 includes, or is otherwise embodied as, any device or collection of devices capable of expelling air to draw tape fragments, contaminants, or debris away from a roll of material supported on the material support rollers 202, 204 during a taping operation. As best seen in FIG. 14, using the air nozzle 1160 as an example, the air nozzle 1160 includes discharge ports 1462. Each discharge port 1462 is configured to expel air to draw the aforementioned materials and/or matter away from a roll of material during a taping operation.

The illustrative guide roller 224 may be referred to as a tape backside roller, at least in the respect that the guide roller 224 is configured to contact the backside (i.e., non-sticky side) of the tape 104 supported on the tape hub 222 during a taping operation. The illustrative guide roller 230 may be referred to as a tape sticky side roller, at least in the respect that the guide roller 230 is configured to contact the sticky side of the tape 104 supported on the tape hub 222 during a taping operation. The illustrative guide roller 236 may be referred to as a tape head roller of the tape head assembly 122 in the sense that tape 104 guided around the roller 236 is applied directly to a roll of material by the guide roller 236 in use of the tape head assembly 122.

Figure 13:
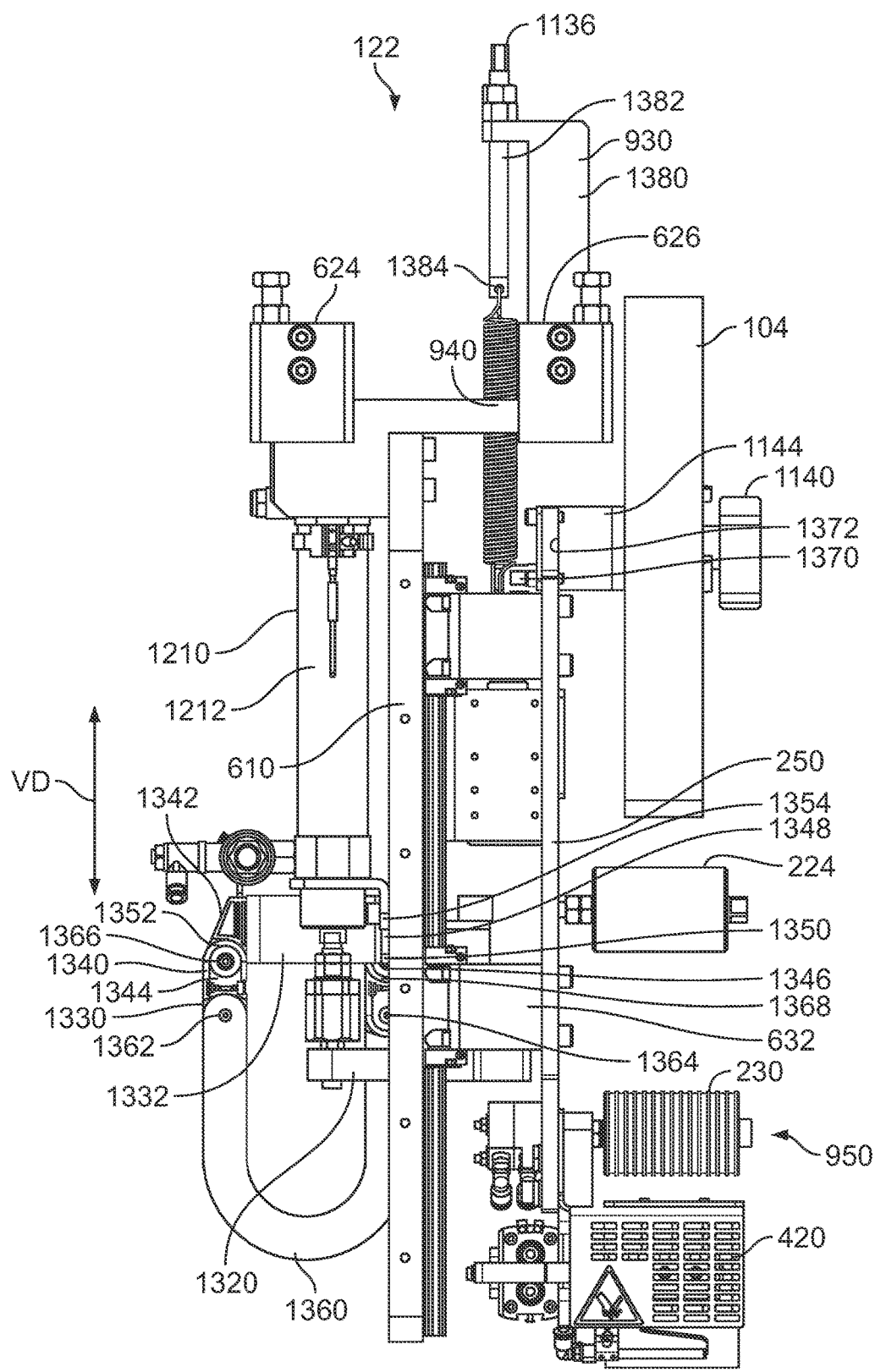
FIG. 13 is a side elevation view of a tape head assembly that may be included in the taping station shown in FIG. 1.

Referring now to FIGS. 12 and 13, the actuator 1210 of the tape head assembly 122 is shown in greater detail. For ease of illustration, the main plate 250 is shown substantially in the lowered position 1052 in FIG. 12 and substantially in the raised position 950 in FIG. 13. In the illustrative embodiment, the actuator 1210 includes, or is otherwise embodied as, a pneumatic actuator driven by compressed air. The actuator 1210 includes a cylinder 1212 and a rod 1214 movably coupled to the cylinder 1212. The rod 1214 is illustratively movable in the cylinder 1212 to vary the length of the actuator 1210 and cause extension (i.e., an increase in length) and retraction (i.e., a decrease in length) thereof. In other embodiments, however, it should be appreciated that the actuator 1210 may include, or otherwise be embodied as, any device or collection of devices capable of driving vertical translation of the main plate 250 relative to the backing plate 610 between the raised position 950 and the lowered position 1052, such as a hydraulically-powered actuator, an electrically-powered actuator, or the like, for example.

In the illustrative embodiment, the cylinder 1212 of the actuator 1210 is mounted to the back surface 612 of the backing plate 610 with L-shaped brackets 1216 and 1218 that are spaced apart from one another in the vertical direction VD. The rod 1214 of the actuator 1210 is directly coupled to an actuation bar 1320 as best seen in FIG. 13. The actuation bar 1320 is directly coupled to the two lower guide blocks (only guide block 632 is shown) that are affixed to the main plate 250. As such, the actuation bar 1320 at least partially establishes a coupling between the backing plate 610 and the main plate 250.

Extension of the actuator 1210 drives downward translation of the actuation bar 1320 in the vertical direction VD and corresponding downward translation of the main plate 250 along the guide tracks 620, 622 toward the lowered position 1052. Conversely, retraction of the actuator 1210 drives upward translation of the actuation bar 1320 in the vertical direction VD and corresponding upward translation of the main plate 250 along the guide tracks 620, 622 toward the raised position 950. In the illustrative embodiment, the actuation bar 1320 is movable in the vertical direction VD through a slot 1208 formed in the backing plate 610 in response to extension or retraction of the actuator 1210.

The extension or retraction speed of the actuator 1210 is adjustable via adjustment controls 1224 and 1226. The adjustment control 1224 is located in close proximity to the bracket 1216 and the adjustment control 1226 is located in close proximity to the bracket 1218. In the illustrative embodiment, the controls 1224, 1226 may each include, or otherwise be embodied as, one or more valves, such as one or more solenoid valves configured to receive control signals issued by a controller, for example. In other embodiments, the controls 1224, 1226 may each include, or otherwise be embodied as, one or more manually adjustable valves.

The illustrative actuator 1230 housed by the casing 1220 includes, or is otherwise embodied as, a rotary pneumatic cylinder driven by compressed air. Of course, in other embodiments, the actuator 1230 may include, or otherwise be embodied as, another suitable actuator, such as a hydraulically-powered actuator or an electrically-powered actuator, for example. The actuator 1230 is coupled to the cutting arm 410 to drive rotation of the cutting arm 410 relative to the casing 1220 about a rotational axis 1232 between the home position 414 and the cutting position 416 (i.e., in the taping configuration 210) or between the home position 510 and the cutting position 512 (i.e., in the taping configuration 300). The cutting arm 410 illustratively includes a pivot bar 1234 that is pivotally coupled to the casing 1220 and a knife extension 1236 that is affixed to the pivot bar 1234. The knife extension 1236 includes, or is otherwise coupled to, the blade 412.

In the illustrative embodiment, the tape head assembly 122 includes L-shaped braces 1240, 1242 that are affixed directly to the back surface 612 of the backing plate 610. The braces 1240, 1242 are arranged opposite one another on opposite sides of the cylinder 1212 of the actuator 1210. The braces 1240, 1242 are aligned with the bracket 1216 in the vertical direction VD. The braces 1240, 1242 are also affixed directly to the undersides of the guide clips 624, 626. As a result, the braces 1240, 1242 indirectly couple the backing plate 610 to the guide clips 624, 626 so that the backing plate 610 is appended to, and supported by, the guide clips 624, 626.

As shown in FIGS. 12 and 13, the tape head assembly 122 includes a U-shaped linkage 1330 affixed to the back surface 612 of the backing plate 610 via a mount plate 1332. The linkage 1330 includes upper links 1340, 1346 defining opposite ends 1352, 1354 of the linkage 1330 in the longitudinal direction LD. A U-shaped bridge link 1360 extends between the upper links 1340, 1346 and couples the links 1340, 1346 to one another. In some embodiments, as best seen in FIG. 12, the bridge link 1360 is pivotal relative to the link 1340 about an axis 1362 and the bridge link 1360 is pivotal relative to the link 1346 about an axis 1364. Additionally, in some embodiments, one half 1342 of the upper link 1340 is pivotal relative to another half 1344 of the upper link 1340 about an axis 1366, and one half 1348 of the upper link 1346 is pivotal relative to another half 1350 of the upper link 1346 about an axis 1368.

As best seen in FIG. 13, the illustrative spring 940 extends from the mounting post 930 to a pin 1370 affixed to a back surface 1372 of the main plate 250. The mounting post 930 includes a pedestal 1380 that carries a rod 1382 having an aperture 1384 formed in one end 1386 thereof. The spring 940 is received by the aperture 1384 such that the spring 940 extends from the rod 1382 to the pin 1370 in the vertical direction VD. The pressure adjustment screw 1136 is illustratively located atop the pedestal 1380.

Referring now to FIG. 14, various components and/or structures arranged proximate the casing 1220 are depicted in greater detail. For ease of illustration, the cutting arm 410 is depicted in the home position (i.e., the home position 414 or the home position 510). As indicated above, the pivot bar 1234 of the cutting arm 410 is pivotally coupled to the casing 1220. In particular, via fasteners 1422, 1424, the pivot bar 1234 is coupled to a rotary hub 1420 configured for rotation relative to the casing 1220. The fasteners 1422, 1424 are illustratively movable within a slot 1430 formed in the pivot bar 1234 to adjust the profile of the cutting arm 410. More specifically, movement of the fasteners 1422, 1424 within the slot 1430 varies a distance D1 between an end 1432 of the pivot bar 1234 and the casing 1220 to adjust the profile of the cutting arm 410.

In the illustrative embodiment, the tape head assembly 122 includes a regulator bank 1440 configured to regulate the flow of air delivered to one or more components of the tape head assembly 122, such as the air nozzles 1150, 1160. The regulator bank 1440 may include, or otherwise be embodied as, one or more valves 1442 configured for automated or manual operation to selectively adjust air flow to the air nozzles 1150, 1160 and the discharge ports 1462. It should be appreciated that the regulator bank 1440, and any other pneumatically-operated components of the tape head assembly 122, may include, or be coupled to, various fittings (e.g., quick disconnect fittings) to facilitate connection of fluid conduits, hoses, tubes, lines, or the like.

Figure 15:
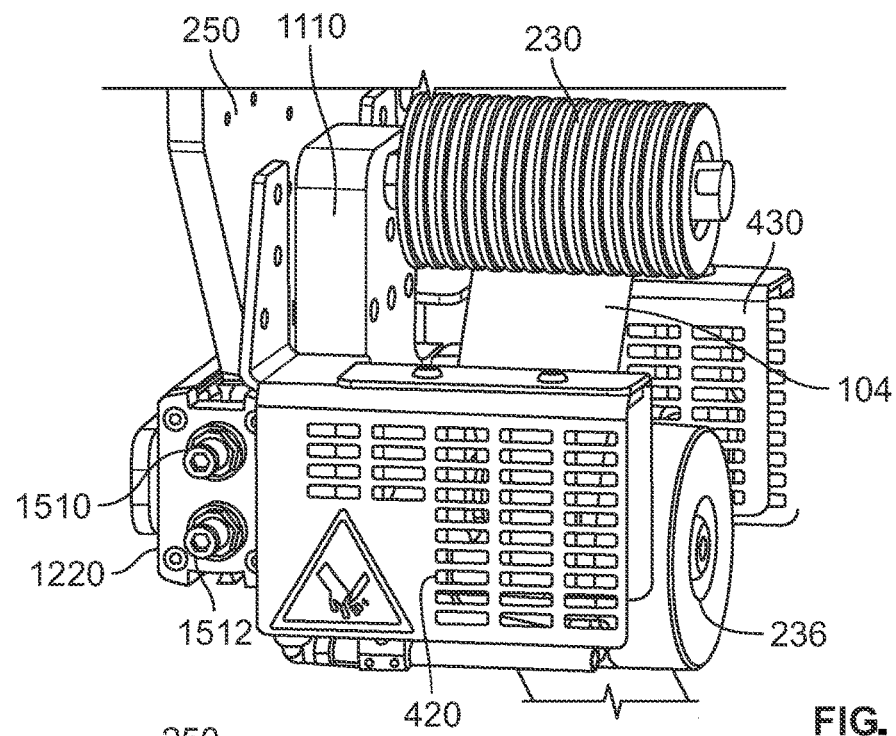
FIG. 15 is a magnified perspective view of one portion of the tape head assembly of FIG. 11.

Referring now to FIG. 15, movement of the cutting arm 410 (e.g., the rotation of the cutting arm 410 between the home and cutting positions described herein) may be adjusted by adjustment pins 1510, 1512. The illustrative adjustment pins 1510, 1512 are operable to alter the stroke length of the cutting arm 410, such as by adjusting a start position (e.g., a home position) or a stop position (e.g., a cutting position) of the cutting arm 410. The adjustment pins 1510, 1512 are coupled to the casing 1220 such that the adjustment pins 1510, 1512 extend outwardly beyond the casing 1220. In some embodiments, the adjustment pins 1510, 1512 include, or are otherwise embodied as, devices configured to adjust compressed air flow to the actuator 1230, such as one or more valves, for example.

Figure 16:
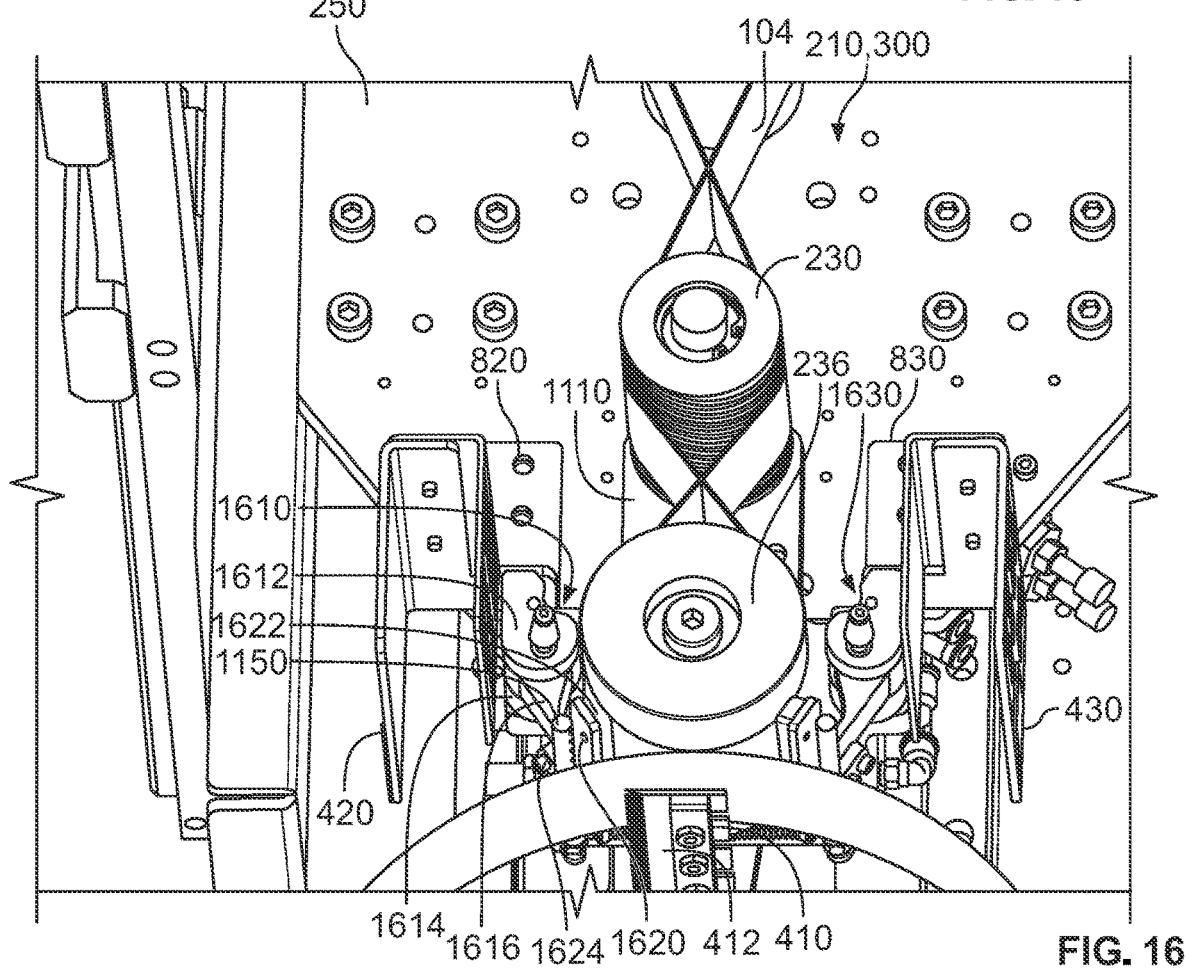
FIG. 16 is a partial front perspective view of a plurality of guide rollers supported on a main plate of a tape head assembly that may be included in the taping station shown in FIG. 1.

Referring now to FIG. 16, for ease of illustration, the tape head assembly 122 is depicted in each of the taping configurations 210, 300 with tape 104 guided over the guide rollers 224, 230, 236. In the illustrative embodiment, the tape head assembly 122 includes a carrier assembly 1610 arranged between the guide roller 236 and the cover 420 and a carrier assembly 1630 arranged between the guide roller 236 and the cover 430. The carrier assemblies 1610, 1630 are identical to one another such that only detailed discussion of the carrier assembly 1610 is provided below. Each of the carrier assemblies 1610, 1630 is affixed to the mounting tee 1110.

The carrier assembly 1610 illustratively includes a plate 1612, a plate 1614 coupled to the plate 1612, and a pivot arm 1616 coupled between the plates 1612, 1614. In the illustrative embodiment, the pivot arm 1616 is pivotal relative to the plates 1612, 1614 about a pivot axis (not shown). The pivot arm 1616 includes an attachment flange 1620 that has a pad 1622 coupled thereto. The pad 1622 is disposed in confronting relation to the guide roller 236. In some embodiments, the pad 1622 is configured to contact the tape 104 wound around the guide roller 236 to guide the tape 104 and/or adjust the tension of the tape 104 during a taping operation.

The carrier assembly 1610 also includes a holder bracket 1624 affixed to the pivot arm 1616 that carries the air nozzle 1150. In at least some embodiments, the holder bracket 1624 is formed to include a groove or channel (not shown) sized to receive the air nozzle 1150 such that the air nozzle 1150 extends parallel or substantially parallel to the pivot arm 1616 in the longitudinal direction LD when the air nozzle 1150 is received by the holder bracket 1624. Additionally, when the air nozzle 1150 is received by the holder bracket 1624, the attachment flange 1620 is arranged between the air nozzle 1150 and the guide roller 236.

In the illustrative embodiment, the pivot arm 1616 is pivotal about the pivot axis to adjust the position of the attachment flange 1620, the pad 1622 coupled to the attachment flange 1620, and the air nozzle 1150 coupled to the attachment flange 1620 relative to the guide roller 236. Such adjustment may be necessary to ensure air expelled from the discharge ports 1462 of the air nozzle 1150 draws tape fragments, residual matter, contaminants, or debris away from the guide roller 236 subsequent to cutting the tape 104 with the cutting arm 410 during a taping operation.

In some embodiments, a method of processing material includes (i) wrapping material around a mandrel (e.g., the mandrel(s) 114) of a winder (e.g., the winder 112) to produce one or more rolls of material (e.g., the roll 126), (ii) conveying the one or more rolls of material (e.g., using the conveyor 106) to a taping station (e.g., the taping station 120) arranged downstream of the winder, (iii) supporting multiple tape head assemblies (e.g., the tape head assemblies 122, 124) for translation relative to one another in a longitudinal direction (e.g., the longitudinal direction LD), and (iv) applying tape (e.g., tape 104) to the one or more rolls of material with the tape head assemblies at multiple locations along an axial length of each of the one or more rolls of material.

In some embodiments, applying tape to the one or more rolls of material with the tape head assemblies includes (i) securing rolls of tape with tape hubs (e.g., the tape hub 222) of the tape head assemblies and (ii) guiding tape from the rolls of tape secured by the tape hubs circumferentially around the one or more rolls of material.

In some embodiments, guiding tape from the rolls of tape secured by the tape hubs circumferentially around the one or more rolls of material includes guiding tape over a first guide roller (e.g., the guide roller 224), a second guide roller (e.g., the guide roller 230), and a third guide roller (e.g., the guide roller 236) to permit clockwise or counterclockwise application of tape by the tape head assemblies to the one or more rolls of material. The first guide roller, the second guide roller, and the third guide roller are spaced from one another in a vertical direction (e.g., the vertical direction VD) and aligned along a vertical axis (e.g., the vertical axis 242).

In some embodiments, control of various components of each tape head assembly disclosed herein is performed by a control system (not shown). The control system includes a controller having a processor and a memory device coupled to the processor, at least in some embodiments. The memory device includes instructions stored therein that are executable by the processor to perform various functions. In some embodiments, the controller is communicatively coupled to certain components of each tape head assembly to receive input signals from those components and/or issue control signals to those components. Those components include, but are not limited to, the actuators 1210, 1230, the controls 1224, 1226, the regulator bank 1440, and the adjustment pins 1510, 1512. Additional components, such as (i) one or more sensors configured to monitor the position of the cutting arm 410 during movement thereof between the home and cutting positions, (ii) one or more sensors configured to monitor the position of the main plate 250 during movement thereof between the raised and lowered positions, (iii) one or more sensors configured to monitor extension or retraction of the actuator 1210, and (iv) one or more sensors configured to monitor rotary movement of the actuator 1230 may be communicatively coupled to the controller, at least in some embodiments.

In some embodiments, the memory device of the controller may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device may be embodied as a block addressable memory, such as those based on NAND or NOR technologies. The memory device may also include future generation nonvolatile devices, such as a three dimensional crosspoint memory device (e.g., Intel 3D XPoint™ memory), or other byte addressable write-in-place nonvolatile memory devices. In some embodiments, the memory device may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

The processor of the controller may be embodied as, or otherwise include, any type of processor, controller, or other compute circuit capable of performing various tasks such as compute functions and/or controlling the functions of each of the tape head assemblies 122, 124. For example, the processor may be embodied as a single or multi-core processor(s), a microcontroller, or other processor or processing/controlling circuit. In some embodiments, the processor may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor may be embodied as, or otherwise include, a high-power processor, an accelerator co-processor, or a storage controller. In some embodiments still, the processor may include more than one processor, controller, or compute circuit.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A taping station to apply tape to one or more rolls of material, the taping station comprising:
 a plurality of material support rollers to support the one or more rolls of material for rotation in a circumferential direction during a taping operation; and
 a plurality of tape head assemblies supported for translation relative to one another in a longitudinal direction transverse to the circumferential direction, wherein the plurality of tape head assemblies are positioned relative to one another along an axial length of each of the one or more rolls of material such that the plurality of tape head assemblies cooperate to apply tape to the one or more rolls of material at multiple locations along the axial length during the taping operation.

2. The taping station of claim 1, wherein during the taping operation, the plurality of tape head assemblies is supported for linear translation relative to one another in the longitudinal direction along a plurality of guide rails of the taping station.

3. The taping station of claim 1, wherein each of the plurality of tape head assemblies includes a housing located at a lowermost end of the tape head assembly in a vertical direction.

4. The taping station of claim 3, wherein each of the plurality of tape head assemblies includes a cutting arm pivotally coupled to the housing that includes a blade.

5. The taping station of claim 4, wherein each of the plurality of tape head assemblies includes an actuator housed by the housing that is coupled to the cutting arm to drive rotation of the cutting arm relative to the housing to selectively cut tape with the blade during the taping operation.

6. The taping station of claim 5, wherein when each of the plurality of tape head assemblies applies tape to the one or more rolls of material during the taping operation, the actuator is configured to drive rotation of the cutting arm relative to the housing between a home position, in which the cutting arm is at least partially covered by a cover aligned with the housing in the vertical direction to resist tape from being cut with the cutting arm, and a cutting position, in which the cutting arm is not covered by the cover to allow tape to be cut with the cutting arm.

7. The taping station of claim 1, wherein the taping station is positioned downstream of a winding station to receive the one or more rolls of material from the winding station.

8. The taping station of claim 1, wherein each of the plurality of tape head assemblies comprises:
 a tape hub to support a roll of tape during the taping operation; and
 a plurality of guide rollers spaced from one another in a vertical direction to guide tape from the roll of tape supported on the tape hub circumferentially around each of the one or more rolls of material during the taping operation.

9. The taping station of claim 8, wherein the plurality of guide rollers includes a first guide roller, a second guide roller arranged beneath the first guide roller in the vertical direction relative to the tape hub, and a third guide roller arranged beneath the second guide roller in the vertical direction relative to the tape hub.

10. The taping station of claim 9, wherein each of the plurality of tape head assemblies includes a plurality of air nozzles arranged in close proximity to the third guide roller, and wherein each of the plurality of air nozzles includes a plurality of discharge ports to expel air to draw tape fragments, contaminants, or debris away from the one or more rolls of material during the taping operation.

11. The taping station of claim 10, wherein the plurality of air nozzles include first and second air nozzles arranged opposite one another relative to the third guide roller.

12. A taping station to apply tape to one or more rolls of material, the taping station comprising:
   a plurality of material support rollers to support the one or more rolls of material for rotation in a circumferential direction during a taping operation; and
   a plurality of tape head assemblies supported for translation relative to one another in a longitudinal direction transverse to the circumferential direction,
   wherein each of the plurality of tape head assemblies includes a backing plate having a front surface and a back surface arranged opposite the front surface and an actuator coupled to the back surface of the backing plate.

13. The taping station of claim 12, wherein each of the plurality of tape head assemblies includes a plurality of guide tracks coupled to the front surface of the backing plate.

14. The taping station of claim 13, wherein each of the plurality of tape head assemblies includes a main plate supporting a roll of tape during the taping operation that is coupled to the backing plate and the actuator.

15. The taping station of claim 14, wherein each of the plurality of tape head assemblies includes a plurality of guide blocks affixed to the main plate such that each of the plurality of guide blocks receives one of the plurality of guide tracks to permit translation of the main plate relative to the backing plate in a vertical direction along the plurality of guide tracks.

16. The taping station of claim 15, wherein each of the plurality of tape head assemblies includes a plurality of guide rollers supported by the main plate and including a first guide roller, a second guide roller, and a third guide roller to guide tape from the roll of tape supported by the main plate circumferentially around the one or more rolls of material during the taping operation.

17. The taping station of claim 16, wherein the actuator drives vertical translation of the main plate relative to the backing plate between a raised position, in which the tape head assembly is spaced apart from the one or more rolls of material, and a lowered position, in which the tape head assembly is positioned in close proximity to the one or more rolls of material to facilitate application of tape to the one or more rolls by the tape head assembly.

18. A taping station to apply tape to one or more rolls of material, the taping station comprising:
   a plurality of material support rollers to support the one or more rolls of material for rotation in a circumferential direction during a taping operation; and
   a plurality of tape head assemblies supported for translation relative to one another in a longitudinal direction transverse to the circumferential direction,
   wherein the plurality of tape head assemblies cooperate to apply tape to the one or more rolls of material at multiple locations along an axial length of each of the one or more rolls of material during the taping operation, and
   wherein each of the plurality of tape head assemblies includes a backing plate having a front surface and a back surface arranged opposite the front surface and an actuator coupled to the back surface of the backing plate.

19. The taping station of claim 18, wherein the plurality of tape head assemblies are positioned relative to one another along the axial length of each of the one or more rolls of material such that the plurality of tape head assemblies cooperate to apply tape to the one or more rolls of material at multiple locations along the axial length during the taping operation.

20. The taping station of claim 18, wherein each of the plurality of tape head assemblies includes a plurality of guide tracks coupled to the front surface of the backing plate.

\* \* \* \* \*